US007904801B2

(12) United States Patent
Catorcini et al.

(10) Patent No.: US 7,904,801 B2
(45) Date of Patent: Mar. 8, 2011

(54) RECURSIVE SECTIONS IN ELECTRONIC FORMS

(75) Inventors: Alessandro Catorcini, Redmond, WA (US); Anand Ramagopalrao, Bellevue, WA (US); Michael A Smuga, Seattle, WA (US); Michael B. Palmer, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 1568 days.

(21) Appl. No.: 11/012,472

(22) Filed: Dec. 15, 2004

(65) Prior Publication Data

US 2006/0129583 A1 Jun. 15, 2006

(51) Int. Cl.
*G06N 3/00* (2006.01)

(52) U.S. Cl. .......................... 715/223; 715/221; 715/222

(58) Field of Classification Search .................. 715/221, 715/222, 223, 224, 225, 226
See application file for complete search history.

(56) References Cited

U.S. PATENT DOCUMENTS

| | | | |
|---|---|---|---|
| 4,201,978 | A | 5/1980 | Nally |
| 4,498,147 | A | 2/1985 | Agnew et al. |
| 4,514,800 | A | 4/1985 | Gruner et al. |
| 4,564,752 | A | 1/1986 | Lepic et al. |
| 4,641,274 | A | 2/1987 | Swank |
| 4,674,040 | A | 6/1987 | Barker et al. |
| 4,723,211 | A | 2/1988 | Barker et al. |
| 4,739,477 | A | 4/1988 | Barker et al. |
| 4,815,029 | A | 3/1989 | Barker et al. |
| 4,847,749 | A | 7/1989 | Collins et al. |
| 4,910,663 | A | 3/1990 | Bailey |
| 4,933,880 | A | 6/1990 | Borgendal et al. |
| 4,962,475 | A | 10/1990 | Hernandez et al. |
| 5,025,484 | A | 6/1991 | Yamanari et al. |
| 5,072,412 | A | 12/1991 | Henderson, Jr. et al. |
| 5,179,703 | A | 1/1993 | Evans |
| 5,182,709 | A | 1/1993 | Makus |
| 5,187,786 | A | 2/1993 | Densmore et al. |
| 5,191,645 | A | 3/1993 | Carlucci et al. |
| 5,195,183 | A | 3/1993 | Miller et al. |
| 5,204,947 | A | 4/1993 | Bernstein et al. |
| 5,206,951 | A | 4/1993 | Khoyi et al. |
| 5,218,672 | A | 6/1993 | Morgan et al. |
| 5,222,160 | A | 6/1993 | Sakai et al. |
| 5,228,100 | A | 7/1993 | Takeda et al. |
| 5,237,680 | A | 8/1993 | Adams et al. |
| 5,249,275 | A | 9/1993 | Srivastava |
| 5,274,803 | A | 12/1993 | Dubin et al. |
| 5,297,249 | A | 3/1994 | Bernstein et al. |
| 5,297,283 | A | 3/1994 | Kelly, Jr. et al. |
| 5,313,631 | A | 5/1994 | Kao |

(Continued)

FOREIGN PATENT DOCUMENTS

| | | |
|---|---|---|
| EP | 0841615 | 11/1999 |

(Continued)

OTHER PUBLICATIONS

"Adobe GoLive 5.0: User Guide," Adobe Systems, 2000, Chapter 12.*

(Continued)

*Primary Examiner* — Kyle R Stork

(57) ABSTRACT

Systems and/or methods enabling creation and/or use of a recursive section for an electronic form are described. In one embodiment, a system and/or method enables alteration, responsive to graphical selection of a recursive section component, of an electronic form's schema to permit a recursive section. In another embodiment, a system and/or method enables a user to modify a recursive section in an electronic form through a rendering of the electronic form.

8 Claims, 8 Drawing Sheets

U.S. PATENT DOCUMENTS

| | | | |
|---|---|---|---|
| 5,313,646 | A | 5/1994 | Hendricks et al. |
| 5,317,686 | A | 5/1994 | Salas et al. |
| 5,333,317 | A | 7/1994 | Dann |
| 5,339,423 | A | 8/1994 | Beitel et al. |
| 5,339,424 | A | 8/1994 | Fushimi |
| 5,341,478 | A | 8/1994 | Travis, Jr. et al. |
| 5,369,766 | A | 11/1994 | Nakano et al. |
| 5,369,778 | A | 11/1994 | San Soucie et al. |
| 5,371,675 | A | 12/1994 | Greif et al. |
| 5,377,323 | A | 12/1994 | Vasudevan |
| 5,379,419 | A | 1/1995 | Heffernan et al. |
| 5,381,547 | A | 1/1995 | Flug et al. |
| 5,390,325 | A | 2/1995 | Miller |
| 5,396,623 | A | 3/1995 | McCall et al. |
| 5,408,665 | A | 4/1995 | Fitzgerald |
| 5,410,646 | A | 4/1995 | Tondevold et al. |
| 5,410,688 | A | 4/1995 | Williams et al. |
| 5,412,772 | A | 5/1995 | Monson |
| 5,434,975 | A | 7/1995 | Allen |
| 5,436,637 | A | 7/1995 | Gayraud et al. |
| 5,438,659 | A | 8/1995 | Notess et al. |
| 5,440,744 | A | 8/1995 | Jacobson et al. |
| 5,446,842 | A | 8/1995 | Schaeffer et al. |
| 5,455,875 | A | 10/1995 | Chevion et al. |
| 5,459,865 | A | 10/1995 | Heninger et al. |
| 5,481,722 | A | 1/1996 | Skinner |
| 5,497,489 | A | 3/1996 | Menne |
| 5,504,898 | A | 4/1996 | Klein |
| 5,517,655 | A | 5/1996 | Collins et al. |
| 5,535,389 | A | 7/1996 | Elder et al. |
| 5,542,070 | A | 7/1996 | LeBlanc et al. |
| 5,550,976 | A | 8/1996 | Henderson et al. |
| 5,551,035 | A | 8/1996 | Arnold et al. |
| 5,555,325 | A | 9/1996 | Burger |
| 5,566,330 | A | 10/1996 | Sheffield |
| 5,572,643 | A | 11/1996 | Judson |
| 5,572,648 | A | 11/1996 | Bibayan |
| 5,577,252 | A | 11/1996 | Nelson et al. |
| 5,581,686 | A | 12/1996 | Koppolu et al. |
| 5,581,760 | A | 12/1996 | Atkinson et al. |
| 5,600,789 | A | 2/1997 | Parker et al. |
| 5,602,996 | A | 2/1997 | Powers, III et al. |
| 5,608,720 | A | 3/1997 | Biegel et al. |
| 5,625,783 | A | 4/1997 | Ezekiel et al. |
| 5,627,979 | A | 5/1997 | Chang et al. |
| 5,630,126 | A | 5/1997 | Redpath |
| 5,634,121 | A | 5/1997 | Tracz et al. |
| 5,634,124 | A | 5/1997 | Khoyi et al. |
| 5,640,544 | A | 6/1997 | Onodera et al. |
| 5,644,738 | A | 7/1997 | Goldman et al. |
| 5,649,099 | A | 7/1997 | Theimer et al. |
| 5,659,729 | A | 8/1997 | Nielsen |
| 5,664,178 | A | 9/1997 | Sinofsky |
| 5,668,966 | A | 9/1997 | Ono et al. |
| 5,669,005 | A | 9/1997 | Curbow et al. |
| 5,682,536 | A | 10/1997 | Atkinson et al. |
| 5,689,667 | A | 11/1997 | Kurtenbach |
| 5,689,703 | A | 11/1997 | Atkinson et al. |
| 5,704,029 | A | 12/1997 | Wright, Jr. |
| 5,706,501 | A | 1/1998 | Horikiri et al. |
| 5,717,939 | A | 2/1998 | Bricklin et al. |
| 5,721,824 | A | 2/1998 | Taylor |
| 5,740,439 | A | 4/1998 | Atkinson et al. |
| 5,742,504 | A | 4/1998 | Meyer et al. |
| 5,745,683 | A | 4/1998 | Lee et al. |
| 5,745,712 | A | 4/1998 | Turpin et al. |
| 5,748,807 | A | 5/1998 | Lopresti et al. |
| 5,758,184 | A | 5/1998 | Lucovsky et al. |
| 5,758,358 | A | 5/1998 | Ebbo |
| 5,761,408 | A | 6/1998 | Kolawa et al. |
| 5,761,683 | A | 6/1998 | Logan et al. |
| 5,764,984 | A | 6/1998 | Loucks |
| 5,764,985 | A | 6/1998 | Smale |
| 5,778,372 | A | 7/1998 | Cordell et al. |
| 5,778,402 | A | 7/1998 | Gipson |
| 5,784,555 | A | 7/1998 | Stone |
| 5,790,796 | A | 8/1998 | Sadowsky |
| 5,798,757 | A | 8/1998 | Smith |
| 5,801,701 | A | 9/1998 | Koppolu et al. |
| 5,802,304 | A | 9/1998 | Stone |
| 5,806,079 | A | 9/1998 | Rivette et al. |
| 5,815,830 | A | 9/1998 | Anthony |
| 5,826,265 | A | 10/1998 | Van Huben et al. |
| 5,835,777 | A | 11/1998 | Staelin |
| 5,838,906 | A | 11/1998 | Doyle et al. |
| 5,842,018 | A | 11/1998 | Atkinson et al. |
| 5,845,077 | A | 12/1998 | Fawcett |
| 5,845,090 | A | 12/1998 | Collins, III et al. |
| 5,854,630 | A | 12/1998 | Nielsen |
| 5,859,973 | A | 1/1999 | Carpenter et al. |
| 5,862,372 | A | 1/1999 | Morris et al. |
| 5,862,379 | A | 1/1999 | Rubin et al. |
| 5,864,819 | A | 1/1999 | De Armas et al. |
| 5,907,704 | A | 5/1999 | Gudmundson et al. |
| 5,910,895 | A | 6/1999 | Proskauer et al. |
| 5,911,776 | A | 6/1999 | Guck |
| 5,915,112 | A | 6/1999 | Boutcher |
| 5,922,072 | A | 7/1999 | Hutchinson et al. |
| 5,928,363 | A | 7/1999 | Ruvolo |
| 5,929,858 | A | 7/1999 | Shibata et al. |
| 5,940,075 | A | 8/1999 | Mutschler, III et al. |
| 5,950,010 | A | 9/1999 | Hesse et al. |
| 5,956,481 | A | 9/1999 | Walsh et al. |
| 5,960,199 | A | 9/1999 | Brodsky et al. |
| 5,963,964 | A | 10/1999 | Nielsen |
| 5,973,696 | A | 10/1999 | Agranat et al. |
| 5,974,454 | A | 10/1999 | Apfel et al. |
| 5,982,370 | A | 11/1999 | Kamper |
| 5,983,348 | A | 11/1999 | Ji |
| 5,987,480 | A | 11/1999 | Donohue et al. |
| 5,991,710 | A | 11/1999 | Papineni et al. |
| 5,991,731 | A | 11/1999 | Colon et al. |
| 5,991,877 | A | 11/1999 | Luckenbaugh |
| 5,995,103 | A | 11/1999 | Ashe |
| 5,999,740 | A | 12/1999 | Rowley |
| 6,005,570 | A | 12/1999 | Gayraud et al. |
| 6,014,135 | A | 1/2000 | Fernandes |
| 6,016,520 | A | 1/2000 | Facq et al. |
| 6,018,743 | A | 1/2000 | Xu |
| 6,026,379 | A | 2/2000 | Haller et al. |
| 6,026,416 | A | 2/2000 | Kanerva et al. |
| 6,031,989 | A | 2/2000 | Cordell |
| 6,035,297 | A | 3/2000 | Van Huben et al. |
| 6,035,309 | A | 3/2000 | Dauerer et al. |
| 6,044,205 | A | 3/2000 | Reed et al. |
| 6,052,531 | A | 4/2000 | Waldin et al. |
| 6,052,710 | A | 4/2000 | Saliba et al. |
| 6,054,987 | A | 4/2000 | Richardson |
| 6,072,870 | A | 6/2000 | Nguyen et al. |
| 6,078,326 | A | 6/2000 | Kilmer et al. |
| 6,078,327 | A | 6/2000 | Liman et al. |
| 6,078,924 | A | 6/2000 | Ainsbury et al. |
| 6,081,610 | A | 6/2000 | Dwork et al. |
| 6,084,585 | A | 7/2000 | Kraft et al. |
| 6,088,708 | A | 7/2000 | Burch et al. |
| 6,091,417 | A | 7/2000 | Lefkowitz |
| 6,094,657 | A | 7/2000 | Hailpern et al. |
| 6,097,382 | A | 8/2000 | Rosen et al. |
| 6,098,081 | A | 8/2000 | Heidorn et al. |
| 6,108,637 | A | 8/2000 | Blumenau |
| 6,108,783 | A | 8/2000 | Krawczyk et al. |
| 6,115,646 | A | 9/2000 | Fiszman et al. |
| 6,121,965 | A | 9/2000 | Kenney et al. |
| 6,122,647 | A | 9/2000 | Horowitz et al. |
| 6,144,969 | A | 11/2000 | Inokuchi et al. |
| 6,151,624 | A | 11/2000 | Teare et al. |
| 6,154,128 | A | 11/2000 | Wookey et al. |
| 6,163,772 | A | 12/2000 | Kramer et al. |
| 6,167,521 | A | 12/2000 | Smith et al. |
| 6,167,523 | A | 12/2000 | Strong |
| 6,182,094 | B1 | 1/2001 | Humpleman et al. |
| 6,182,095 | B1 | 1/2001 | Leymaster et al. |
| 6,188,401 | B1 | 2/2001 | Peyer |
| 6,191,797 | B1 | 2/2001 | Politis |
| 6,192,367 | B1 | 2/2001 | Hawley et al. |
| 6,195,661 | B1 | 2/2001 | Filepp et al. |
| 6,199,204 | B1 | 3/2001 | Donohue |

| | | | |
|---|---|---|---|
| 6,209,128 | B1 | 3/2001 | Gerard et al. |
| 6,216,152 | B1 | 4/2001 | Wong et al. |
| 6,219,698 | B1 | 4/2001 | Iannucci et al. |
| 6,225,996 | B1 | 5/2001 | Gibb et al. |
| 6,235,027 | B1 | 5/2001 | Herzon |
| 6,253,366 | B1 | 6/2001 | Mutschler, III |
| 6,253,374 | B1 | 6/2001 | Dresevic et al. |
| 6,263,313 | B1 | 7/2001 | Milsted et al. |
| 6,266,810 | B1 | 7/2001 | Tanaka et al. |
| 6,268,852 | B1 | 7/2001 | Lindhorst et al. |
| 6,272,506 | B1 | 8/2001 | Bell |
| 6,275,227 | B1 | 8/2001 | DeStefano |
| 6,275,599 | B1 | 8/2001 | Adler et al. |
| 6,279,042 | B1 | 8/2001 | Ouchi |
| 6,281,896 | B1 | 8/2001 | Alimpich et al. |
| 6,282,711 | B1 | 8/2001 | Halpern et al. |
| 6,286,033 | B1 | 9/2001 | Kishinsky et al. |
| 6,292,897 | B1 | 9/2001 | Gennaro et al. |
| 6,297,819 | B1 | 10/2001 | Furst |
| 6,300,948 | B1 | 10/2001 | Geller et al. |
| 6,307,955 | B1 | 10/2001 | Zank et al. |
| 6,308,179 | B1 | 10/2001 | Petersen et al. |
| 6,308,273 | B1 | 10/2001 | Goertzel et al. |
| 6,311,271 | B1 | 10/2001 | Gennaro et al. |
| 6,314,415 | B1 | 11/2001 | Mukherjee |
| 6,321,259 | B1 | 11/2001 | Ouellette et al. |
| 6,321,334 | B1 | 11/2001 | Jerger et al. |
| 6,327,628 | B1 | 12/2001 | Anuff et al. |
| 6,331,864 | B1 | 12/2001 | Coco et al. |
| 6,342,907 | B1 | 1/2002 | Petty et al. |
| 6,343,149 | B1 | 1/2002 | Motoiwa |
| 6,343,302 | B1 | 1/2002 | Graham |
| 6,345,256 | B1 | 2/2002 | Milsted et al. |
| 6,345,278 | B1 | 2/2002 | Hitchcock et al. |
| 6,345,361 | B1 | 2/2002 | Jerger et al. |
| 6,347,323 | B1 | 2/2002 | Garber et al. |
| 6,349,408 | B1 | 2/2002 | Smith |
| 6,351,574 | B1 | 2/2002 | Yair et al. |
| 6,353,851 | B1 | 3/2002 | Anupam et al. |
| 6,353,926 | B1 | 3/2002 | Parthesarathy et al. |
| 6,356,906 | B1 | 3/2002 | Lippert et al. |
| 6,357,038 | B1 | 3/2002 | Scouten |
| 6,366,907 | B1 | 4/2002 | Fanning et al. |
| 6,366,912 | B1 | 4/2002 | Wallent et al. |
| 6,367,013 | B1 | 4/2002 | Bisbee et al. |
| 6,369,840 | B1 | 4/2002 | Barnett et al. |
| 6,369,841 | B1 | 4/2002 | Salomon et al. |
| 6,374,402 | B1 | 4/2002 | Schmeidler et al. |
| 6,381,742 | B2 | 4/2002 | Forbes et al. |
| 6,381,743 | B1 | 4/2002 | Mutschler, III |
| 6,389,434 | B1 | 5/2002 | Rivette et al. |
| 6,393,456 | B1 | 5/2002 | Ambler et al. |
| 6,396,488 | B1 | 5/2002 | Simmons et al. |
| 6,405,221 | B1 | 6/2002 | Levine et al. |
| 6,408,311 | B1 | 6/2002 | Baisley et al. |
| 6,414,700 | B1 | 7/2002 | Kurtenbach et al. |
| 6,421,070 | B1 | 7/2002 | Ramos et al. |
| 6,421,656 | B1 | 7/2002 | Cheng et al. |
| 6,425,125 | B1 | 7/2002 | Fries et al. |
| 6,429,885 | B1 | 8/2002 | Saib et al. |
| 6,434,563 | B1 | 8/2002 | Pasquali et al. |
| 6,434,564 | B2 | 8/2002 | Ebert |
| 6,442,563 | B1 | 8/2002 | Bacon et al. |
| 6,442,755 | B1 | 8/2002 | Lemmons et al. |
| 6,446,110 | B1 | 9/2002 | Lection et al. |
| 6,449,617 | B1 | 9/2002 | Quinn et al. |
| 6,457,009 | B1 | 9/2002 | Bollay |
| 6,460,058 | B2 | 10/2002 | Koppolu et al. |
| 6,463,419 | B1 | 10/2002 | Kluss |
| 6,470,349 | B1 | 10/2002 | Heninger et al. |
| 6,473,800 | B1 | 10/2002 | Jerger et al. |
| 6,476,828 | B1 | 11/2002 | Burkett et al. |
| 6,476,833 | B1 | 11/2002 | Moshfeghi |
| 6,477,544 | B1 | 11/2002 | Bolosky et al. |
| 6,480,860 | B1 | 11/2002 | Monday |
| 6,487,566 | B1 | 11/2002 | Sundaresan |
| 6,490,601 | B1 | 12/2002 | Markus et al. |
| 6,493,702 | B1 | 12/2002 | Adar et al. |
| 6,501,864 | B1 | 12/2002 | Eguchi et al. |
| 6,502,101 | B1 | 12/2002 | Verprauskus et al. |
| 6,502,103 | B1 | 12/2002 | Frey et al. |
| 6,505,230 | B1 | 1/2003 | Mohan et al. |
| 6,505,300 | B2 | 1/2003 | Chan et al. |
| 6,507,856 | B1 | 1/2003 | Chen et al. |
| 6,516,322 | B1 | 2/2003 | Meredith |
| 6,519,617 | B1 | 2/2003 | Wanderski et al. |
| RE38,070 | E | 4/2003 | Spies et al. |
| 6,546,546 | B1 | 4/2003 | Van Doorn et al. |
| 6,549,221 | B1 | 4/2003 | Brown et al. |
| 6,549,878 | B1 | 4/2003 | Lowry et al. |
| 6,549,922 | B1 | 4/2003 | Srivastava et al. |
| 6,553,402 | B1 | 4/2003 | Makarios et al. |
| 6,560,616 | B1 | 5/2003 | Garber |
| 6,560,620 | B1 | 5/2003 | Ching |
| 6,560,640 | B2 | 5/2003 | Smethers |
| 6,563,514 | B1 | 5/2003 | Samar |
| 6,571,253 | B1 | 5/2003 | Thompson et al. |
| 6,578,144 | B1 | 6/2003 | Gennaro et al. |
| 6,581,061 | B2 | 6/2003 | Graham |
| 6,584,469 | B1 | 6/2003 | Chiang et al. |
| 6,584,548 | B1 | 6/2003 | Bourne et al. |
| 6,585,778 | B1 | 7/2003 | Hind et al. |
| 6,589,290 | B1 | 7/2003 | Maxwell et al. |
| 6,594,686 | B1 | 7/2003 | Edwards et al. |
| 6,598,219 | B1 | 7/2003 | Lau |
| 6,603,489 | B1 | 8/2003 | Edlund et al. |
| 6,604,099 | B1 | 8/2003 | Chung et al. |
| 6,606,606 | B2 | 8/2003 | Starr |
| 6,609,200 | B2 | 8/2003 | Anderson et al. |
| 6,611,822 | B1 | 8/2003 | Beams et al. |
| 6,611,840 | B1 | 8/2003 | Baer et al. |
| 6,611,843 | B1 | 8/2003 | Jacobs |
| 6,613,098 | B1 | 9/2003 | Sorge et al. |
| 6,615,276 | B1 | 9/2003 | Mastrianni et al. |
| 6,629,109 | B1 | 9/2003 | Koshisaka |
| 6,631,357 | B1 | 10/2003 | Perkowski |
| 6,631,379 | B2 | 10/2003 | Cox |
| 6,631,497 | B1 | 10/2003 | Jamshidi et al. |
| 6,631,519 | B1 | 10/2003 | Nicholson et al. |
| 6,632,251 | B1 | 10/2003 | Rutten et al. |
| 6,635,089 | B1 | 10/2003 | Burkett et al. |
| 6,636,845 | B2 | 10/2003 | Chau et al. |
| 6,643,633 | B2 | 11/2003 | Chau et al. |
| 6,643,652 | B2 | 11/2003 | Helgeson et al. |
| 6,643,684 | B1 | 11/2003 | Malkin et al. |
| 6,651,217 | B1 | 11/2003 | Kennedy et al. |
| 6,654,737 | B1 | 11/2003 | Nunez |
| 6,654,932 | B1 | 11/2003 | Bahrs et al. |
| 6,658,417 | B1 | 12/2003 | Stakutis et al. |
| 6,658,622 | B1 | 12/2003 | Aiken et al. |
| 6,661,920 | B1 | 12/2003 | Skinner |
| 6,668,369 | B1 | 12/2003 | Krebs et al. |
| 6,671,805 | B1 | 12/2003 | Brown et al. |
| 6,675,202 | B1 | 1/2004 | Perttunen |
| 6,678,717 | B1 | 1/2004 | Schneider |
| 6,681,370 | B2 | 1/2004 | Gounares et al. |
| 6,691,230 | B1 | 2/2004 | Bardon |
| 6,691,281 | B1 | 2/2004 | Sorge et al. |
| 6,697,944 | B1 | 2/2004 | Jones et al. |
| 6,701,434 | B1 | 3/2004 | Rohatgi |
| 6,701,486 | B1 | 3/2004 | Weber et al. |
| 6,704,906 | B1 | 3/2004 | Yankovich et al. |
| 6,711,679 | B1 | 3/2004 | Guski et al. |
| 6,720,985 | B1 | 4/2004 | Silverbrook et al. |
| 6,725,426 | B1 | 4/2004 | Pavlov |
| 6,728,755 | B1 | 4/2004 | de Ment |
| 6,735,721 | B1 | 5/2004 | Morrow et al. |
| 6,745,367 | B1 | 6/2004 | Bates et al. |
| 6,748,385 | B1 | 6/2004 | Rodkin et al. |
| 6,751,777 | B2 | 6/2004 | Bates et al. |
| 6,754,874 | B1 | 6/2004 | Richman |
| 6,757,826 | B1 | 6/2004 | Paltenghe |
| 6,757,868 | B1 | 6/2004 | Glaser et al. |
| 6,760,723 | B2 | 7/2004 | Oshinsky et al. |
| 6,763,343 | B1 | 7/2004 | Brooke et al. |
| 6,772,139 | B1 | 8/2004 | Smith, III |
| 6,772,165 | B2 | 8/2004 | O'Carroll |
| 6,774,926 | B1 | 8/2004 | Ellis et al. |

| | | | |
|---|---|---|---|
| 6,779,154 B1 | 8/2004 | Nussbaum et al. | |
| 6,781,609 B1 | 8/2004 | Barker et al. | |
| 6,782,144 B2 | 8/2004 | Bellavita et al. | |
| 6,799,299 B1 | 9/2004 | Li et al. | |
| 6,801,929 B1 | 10/2004 | Donoho et al. | |
| 6,816,849 B1 | 11/2004 | Halt, Jr. | |
| 6,845,380 B2 | 1/2005 | Su et al. | |
| 6,845,499 B2 | 1/2005 | Srivastava et al. | |
| 6,847,387 B2 | 1/2005 | Roth | |
| 6,848,078 B1 | 1/2005 | Birsan et al. | |
| 6,871,220 B1 | 3/2005 | Rajan et al. | |
| 6,874,130 B1 | 3/2005 | Baweja et al. | |
| 6,876,996 B2 | 4/2005 | Czajkowski et al. | |
| 6,889,359 B1 | 5/2005 | Conner et al. | |
| 6,901,403 B1 | 5/2005 | Bata et al. | |
| 6,915,454 B1 | 7/2005 | Moore et al. | |
| 6,931,532 B1 | 8/2005 | Davis et al. | |
| 6,941,510 B1 | 9/2005 | Ozzie et al. | |
| 6,941,511 B1 | 9/2005 | Hind et al. | |
| 6,941,521 B2 | 9/2005 | Lin et al. | |
| 6,948,129 B1 | 9/2005 | Loghmani | |
| 6,948,133 B2 | 9/2005 | Haley | |
| 6,948,135 B1 | 9/2005 | Ruthfield et al. | |
| 6,950,980 B1 | 9/2005 | Malcolm | |
| 6,961,897 B1 | 11/2005 | Peel, Jr. et al. | |
| 6,963,875 B2 | 11/2005 | Moore et al. | |
| 6,968,503 B1 | 11/2005 | Chang et al. | |
| 6,968,505 B2 | 11/2005 | Stoll et al. | |
| 6,993,714 B2 | 1/2006 | Kaler et al. | |
| 6,996,776 B1 | 2/2006 | Makely et al. | |
| 6,996,781 B1 | 2/2006 | Myers et al. | |
| 7,000,179 B2 | 2/2006 | Yankovich et al. | |
| 7,002,560 B2 | 2/2006 | Graham | |
| 7,003,722 B2 | 2/2006 | Rothchiller et al. | |
| 7,010,580 B1 | 3/2006 | Fu et al. | |
| 7,020,869 B2 | 3/2006 | Abriari et al. | |
| 7,024,417 B1 | 4/2006 | Russakovsky et al. | |
| 7,032,170 B2 | 4/2006 | Poulose | |
| 7,036,072 B1 | 4/2006 | Sulistio et al. | |
| 7,039,875 B2 | 5/2006 | Khalfay et al. | |
| 7,051,273 B1 | 5/2006 | Holt et al. | |
| 7,058,663 B2 | 6/2006 | Johnston et al. | |
| 7,062,764 B2 | 6/2006 | Cohen et al. | |
| 7,065,493 B1 | 6/2006 | Homsi | |
| 7,080,083 B2 | 7/2006 | Kim et al. | |
| 7,080,325 B2 | 7/2006 | Treibach-Heck et al. | |
| 7,086,009 B2 | 8/2006 | Resnick et al. | |
| 7,086,042 B2 | 8/2006 | Abe et al. | |
| 7,088,374 B2 | 8/2006 | David et al. | |
| 7,100,147 B2 | 8/2006 | Miller et al. | |
| 7,103,611 B2 | 9/2006 | Murthy et al. | |
| 7,106,888 B1 | 9/2006 | Silverbrook et al. | |
| 7,107,282 B1 | 9/2006 | Yalamanchi | |
| 7,107,521 B2 | 9/2006 | Santos | |
| 7,146,564 B2 | 12/2006 | Kim et al. | |
| 7,152,205 B2 | 12/2006 | Day et al. | |
| 7,168,035 B1 | 1/2007 | Bell et al. | |
| 7,178,166 B1 | 2/2007 | Taylor et al. | |
| 7,190,376 B1 | 3/2007 | Tonisson | |
| 7,191,394 B1 | 3/2007 | Ardeleanu et al. | |
| 7,213,200 B2 | 5/2007 | Abe et al. | |
| 7,236,982 B2 | 6/2007 | Zlatanov et al. | |
| 7,251,777 B1 * | 7/2007 | Valtchev et al. | 715/234 |
| 7,269,664 B2 * | 9/2007 | Hutsch et al. | 709/246 |
| 7,272,789 B2 | 9/2007 | O'Brien | |
| 7,281,018 B1 | 10/2007 | Begun et al. | |
| 7,296,017 B2 | 11/2007 | Larcheveque et al. | |
| 7,313,758 B2 | 12/2007 | Kozlov | |
| 7,316,003 B1 | 1/2008 | Dulepet et al. | |
| 7,318,237 B2 | 1/2008 | Moriconi et al. | |
| 7,334,187 B1 | 2/2008 | Stanciu et al. | |
| 2001/0007109 A1 | 7/2001 | Lange | |
| 2001/0022592 A1 | 9/2001 | Alimpich et al. | |
| 2001/0024195 A1 | 9/2001 | Hayakawa | |
| 2001/0037345 A1 | 11/2001 | Kiernan et al. | |
| 2001/0054004 A1 | 12/2001 | Powers | |
| 2001/0056429 A1 | 12/2001 | Moore et al. | |
| 2001/0056460 A1 | 12/2001 | Sahota et al. | |
| 2002/0010700 A1 | 1/2002 | Wotring | |
| 2002/0010743 A1 | 1/2002 | Ryan et al. | |
| 2002/0010746 A1 | 1/2002 | Jilk, Jr. et al. | |
| 2002/0013788 A1 | 1/2002 | Pennell et al. | |
| 2002/0019941 A1 | 2/2002 | Chan et al. | |
| 2002/0023111 A1 * | 2/2002 | Arora et al. | 707/513 |
| 2002/0023113 A1 | 2/2002 | Hsing et al. | |
| 2002/0026441 A1 | 2/2002 | Kutay et al. | |
| 2002/0026461 A1 | 2/2002 | Kutay et al. | |
| 2002/0032590 A1 | 3/2002 | Anand et al. | |
| 2002/0032692 A1 | 3/2002 | Suzuki et al. | |
| 2002/0032706 A1 | 3/2002 | Perla et al. | |
| 2002/0032768 A1 | 3/2002 | Voskuil | |
| 2002/0035579 A1 | 3/2002 | Wang et al. | |
| 2002/0035581 A1 | 3/2002 | Reynar et al. | |
| 2002/0040469 A1 | 4/2002 | Pramberger | |
| 2002/0054126 A1 | 5/2002 | Gamon | |
| 2002/0057297 A1 | 5/2002 | Grimes et al. | |
| 2002/0065798 A1 | 5/2002 | Bostleman et al. | |
| 2002/0065847 A1 | 5/2002 | Furukawa et al. | |
| 2002/0070973 A1 | 6/2002 | Croley | |
| 2002/0078074 A1 | 6/2002 | Cho et al. | |
| 2002/0078103 A1 | 6/2002 | Gorman et al. | |
| 2002/0083318 A1 | 6/2002 | Larose | |
| 2002/0099952 A1 | 7/2002 | Lambert et al. | |
| 2002/0100027 A1 | 7/2002 | Binding et al. | |
| 2002/0112224 A1 | 8/2002 | Cox | |
| 2002/0129056 A1 | 9/2002 | Conant et al. | |
| 2002/0133484 A1 | 9/2002 | Chau et al. | |
| 2002/0152222 A1 | 10/2002 | Holbrook | |
| 2002/0152244 A1 | 10/2002 | Dean et al. | |
| 2002/0156772 A1 | 10/2002 | Chau et al. | |
| 2002/0156846 A1 | 10/2002 | Rawat et al. | |
| 2002/0156929 A1 | 10/2002 | Hekmatpour | |
| 2002/0169752 A1 | 11/2002 | Kusama et al. | |
| 2002/0169789 A1 | 11/2002 | Kutay et al. | |
| 2002/0174147 A1 | 11/2002 | Wang et al. | |
| 2002/0174417 A1 | 11/2002 | Sijacic et al. | |
| 2002/0178380 A1 | 11/2002 | Wolf et al. | |
| 2002/0184219 A1 | 12/2002 | Preisig et al. | |
| 2002/0188597 A1 | 12/2002 | Kern et al. | |
| 2002/0188613 A1 | 12/2002 | Chakraborty et al. | |
| 2002/0194219 A1 | 12/2002 | Bradley et al. | |
| 2002/0196281 A1 | 12/2002 | Audleman et al. | |
| 2002/0196288 A1 | 12/2002 | Emrani | |
| 2002/0198891 A1 | 12/2002 | Li et al. | |
| 2002/0198935 A1 | 12/2002 | Crandall, Sr. et al. | |
| 2003/0004951 A1 | 1/2003 | Chokshi | |
| 2003/0007000 A1 | 1/2003 | Carlson et al. | |
| 2003/0014397 A1 | 1/2003 | Chau et al. | |
| 2003/0018668 A1 | 1/2003 | Britton et al. | |
| 2003/0020746 A1 | 1/2003 | Chen et al. | |
| 2003/0023641 A1 | 1/2003 | Gorman et al. | |
| 2003/0025732 A1 | 2/2003 | Prichard | |
| 2003/0026507 A1 | 2/2003 | Zlotnick | |
| 2003/0028550 A1 | 2/2003 | Lee et al. | |
| 2003/0037303 A1 | 2/2003 | Bodlaender et al. | |
| 2003/0043986 A1 | 3/2003 | Creamer et al. | |
| 2003/0046665 A1 | 3/2003 | Ilin | |
| 2003/0048301 A1 | 3/2003 | Menninger | |
| 2003/0051243 A1 | 3/2003 | Lemmons et al. | |
| 2003/0055811 A1 | 3/2003 | Stork et al. | |
| 2003/0055828 A1 | 3/2003 | Koch et al. | |
| 2003/0056198 A1 | 3/2003 | Al-Azzawe et al. | |
| 2003/0061386 A1 | 3/2003 | Brown et al. | |
| 2003/0061567 A1 | 3/2003 | Brown et al. | |
| 2003/0084424 A1 | 5/2003 | Reddy et al. | |
| 2003/0093755 A1 | 5/2003 | O'Carroll | |
| 2003/0110443 A1 | 6/2003 | Yankovich et al. | |
| 2003/0120578 A1 | 6/2003 | Newman | |
| 2003/0120651 A1 | 6/2003 | Bernstein et al. | |
| 2003/0120659 A1 | 6/2003 | Sridhar | |
| 2003/0120671 A1 | 6/2003 | Kim et al. | |
| 2003/0120686 A1 | 6/2003 | Kim et al. | |
| 2003/0126555 A1 | 7/2003 | Aggarwal et al. | |
| 2003/0128196 A1 | 7/2003 | Lapstun et al. | |
| 2003/0135825 A1 | 7/2003 | Gertner et al. | |
| 2003/0140132 A1 | 7/2003 | Champagne et al. | |
| 2003/0158897 A1 | 8/2003 | Ben-Natan et al. | |
| 2003/0163285 A1 | 8/2003 | Nakamura et al. | |

| | | | |
|---|---|---|---|
| 2003/0167277 | A1 | 9/2003 | Hejlsberg et al. |
| 2003/0182268 | A1 | 9/2003 | Lal |
| 2003/0182327 | A1 | 9/2003 | Ramanujam et al. |
| 2003/0187756 | A1 | 10/2003 | Klivington et al. |
| 2003/0187930 | A1 | 10/2003 | Ghaffar et al. |
| 2003/0188260 | A1 | 10/2003 | Jensen et al. |
| 2003/0189593 | A1 | 10/2003 | Yarvin |
| 2003/0192008 | A1 | 10/2003 | Lee |
| 2003/0200506 | A1 | 10/2003 | Abe et al. |
| 2003/0204511 | A1 | 10/2003 | Brundage |
| 2003/0204814 | A1 | 10/2003 | Elo et al. |
| 2003/0205615 | A1 | 11/2003 | Marappan |
| 2003/0212664 | A1 | 11/2003 | Breining et al. |
| 2003/0212902 | A1 | 11/2003 | van der Made |
| 2003/0217053 | A1 | 11/2003 | Bachman et al. |
| 2003/0220930 | A1 | 11/2003 | Milleker et al. |
| 2003/0225469 | A1 | 12/2003 | DeRemer et al. |
| 2003/0225768 | A1 | 12/2003 | Chaudhuri |
| 2003/0225829 | A1 | 12/2003 | Pena et al. |
| 2003/0226132 | A1 | 12/2003 | Tondreau et al. |
| 2003/0233374 | A1 | 12/2003 | Spinola et al. |
| 2003/0233644 | A1 | 12/2003 | Cohen et al. |
| 2003/0236859 | A1 | 12/2003 | Vaschillo et al. |
| 2003/0236903 | A1 | 12/2003 | Piotrowski |
| 2003/0237046 | A1 | 12/2003 | Parker et al. |
| 2003/0237047 | A1 | 12/2003 | Borson |
| 2004/0002939 | A1 | 1/2004 | Arora |
| 2004/0003031 | A1 | 1/2004 | Brown et al. |
| 2004/0003353 | A1 | 1/2004 | Rivera et al. |
| 2004/0003389 | A1 | 1/2004 | Reynar et al. |
| 2004/0010752 | A1 | 1/2004 | Chan et al. |
| 2004/0024842 | A1 | 2/2004 | Witt |
| 2004/0030991 | A1 | 2/2004 | Hepworth et al. |
| 2004/0039990 | A1 | 2/2004 | Bakar et al. |
| 2004/0039993 | A1 | 2/2004 | Kougiouris et al. |
| 2004/0044961 | A1 | 3/2004 | Pesenson |
| 2004/0044965 | A1 | 3/2004 | Toyama et al. |
| 2004/0054966 | A1 | 3/2004 | Busch et al. |
| 2004/0059754 | A1 | 3/2004 | Barghout et al. |
| 2004/0073565 | A1 | 4/2004 | Kaufman et al. |
| 2004/0073868 | A1 | 4/2004 | Easter et al. |
| 2004/0078756 | A1 | 4/2004 | Napper et al. |
| 2004/0083426 | A1 | 4/2004 | Sahu |
| 2004/0088647 | A1 | 5/2004 | Miller et al. |
| 2004/0088652 | A1 | 5/2004 | Abe et al. |
| 2004/0093596 | A1 | 5/2004 | Koyano |
| 2004/0107367 | A1 | 6/2004 | Kisters |
| 2004/0117769 | A1 | 6/2004 | Lauzon et al. |
| 2004/0123277 | A1 | 6/2004 | Schrader et al. |
| 2004/0128296 | A1 * | 7/2004 | Krishnamurthy et al. .... 707/100 |
| 2004/0146199 | A1 | 7/2004 | Berkner et al. |
| 2004/0163041 | A1 | 8/2004 | Engel |
| 2004/0172442 | A1 | 9/2004 | Ripley |
| 2004/0181711 | A1 | 9/2004 | Johnson et al. |
| 2004/0186762 | A1 | 9/2004 | Beaven et al. |
| 2004/0189716 | A1 | 9/2004 | Paoli et al. |
| 2004/0194035 | A1 | 9/2004 | Chakraborty |
| 2004/0205473 | A1 | 10/2004 | Fisher et al. |
| 2004/0205525 | A1 | 10/2004 | Murren et al. |
| 2004/0205534 | A1 | 10/2004 | Koelle |
| 2004/0205571 | A1 | 10/2004 | Adler et al. |
| 2004/0205592 | A1 | 10/2004 | Huang |
| 2004/0205605 | A1 | 10/2004 | Adler et al. |
| 2004/0205653 | A1 | 10/2004 | Hadfield et al. |
| 2004/0205671 | A1 | 10/2004 | Sukehiro et al. |
| 2004/0210599 | A1 | 10/2004 | Friedman et al. |
| 2004/0221238 | A1 | 11/2004 | Cifra et al. |
| 2004/0221245 | A1 | 11/2004 | Chickles et al. |
| 2004/0237030 | A1 | 11/2004 | Malkin |
| 2004/0261019 | A1 | 12/2004 | Imamura et al. |
| 2004/0268229 | A1 | 12/2004 | Paoli et al. |
| 2005/0004893 | A1 | 1/2005 | Sangroniz |
| 2005/0005248 | A1 | 1/2005 | Rockey et al. |
| 2005/0015279 | A1 | 1/2005 | Rucker |
| 2005/0015732 | A1 | 1/2005 | Vedula et al. |
| 2005/0022115 | A1 | 1/2005 | Baumgartner et al. |
| 2005/0027757 | A1 | 2/2005 | Kiessig et al. |
| 2005/0033728 | A1 | 2/2005 | James et al. |
| 2005/0038711 | A1 | 2/2005 | Marlelo |
| 2005/0055627 | A1 | 3/2005 | Lloyd et al. |
| 2005/0060324 | A1 | 3/2005 | Johnson et al. |
| 2005/0060721 | A1 | 3/2005 | Choudhary et al. |
| 2005/0065933 | A1 | 3/2005 | Goering |
| 2005/0065936 | A1 | 3/2005 | Goering |
| 2005/0066287 | A1 | 3/2005 | Tattrie et al. |
| 2005/0071752 | A1 | 3/2005 | Marlatt |
| 2005/0076049 | A1 | 4/2005 | Qubti et al. |
| 2005/0091285 | A1 | 4/2005 | Krishnan et al. |
| 2005/0091305 | A1 | 4/2005 | Lange et al. |
| 2005/0102370 | A1 | 5/2005 | Lin et al. |
| 2005/0102612 | A1 | 5/2005 | Allan et al. |
| 2005/0108104 | A1 | 5/2005 | Woo |
| 2005/0108624 | A1 | 5/2005 | Carrier |
| 2005/0114757 | A1 | 5/2005 | Sahota et al. |
| 2005/0132196 | A1 | 6/2005 | Dietl |
| 2005/0138086 | A1 | 6/2005 | Pecht-Seibert |
| 2005/0138539 | A1 | 6/2005 | Bravery et al. |
| 2005/0171746 | A1 | 8/2005 | Thalhammer-Reyero |
| 2005/0198086 | A1 | 9/2005 | Moore et al. |
| 2005/0198125 | A1 | 9/2005 | Macleod Beck et al. |
| 2005/0198247 | A1 | 9/2005 | Perry et al. |
| 2005/0223063 | A1 | 10/2005 | Chang et al. |
| 2005/0223320 | A1 | 10/2005 | Brintzenhofe et al. |
| 2005/0246304 | A1 | 11/2005 | Knight et al. |
| 2005/0268222 | A1 | 12/2005 | Cheng |
| 2006/0020586 | A1 | 1/2006 | Prompt et al. |
| 2006/0026534 | A1 | 2/2006 | Ruthfield et al. |
| 2006/0031757 | A9 | 2/2006 | Vincent, III |
| 2006/0036995 | A1 | 2/2006 | Chickles et al. |
| 2006/0041838 | A1 | 2/2006 | Khan |
| 2006/0059434 | A1 | 3/2006 | Boss et al. |
| 2006/0069605 | A1 | 3/2006 | Hatoun |
| 2006/0069985 | A1 | 3/2006 | Friedman et al. |
| 2006/0080657 | A1 | 4/2006 | Goodman |
| 2006/0085409 | A1 | 4/2006 | Rys et al. |
| 2006/0101037 | A1 | 5/2006 | Brill et al. |
| 2006/0101051 | A1 | 5/2006 | Carr et al. |
| 2006/0129978 | A1 | 6/2006 | Abriani et al. |
| 2006/0143220 | A1 | 6/2006 | Spencer, Jr. |
| 2006/0161559 | A1 | 7/2006 | Bordawekar et al. |
| 2006/0200754 | A1 | 9/2006 | Kablesh et al. |
| 2007/0036433 | A1 | 2/2007 | Teutsch et al. |
| 2007/0050719 | A1 | 3/2007 | Lui et al. |
| 2007/0061467 | A1 | 3/2007 | Essey et al. |
| 2007/0061706 | A1 | 3/2007 | Cupala et al. |
| 2007/0074106 | A1 | 3/2007 | Ardeleanu et al. |
| 2007/0094589 | A1 | 4/2007 | Paoli |
| 2007/0100877 | A1 | 5/2007 | Paoli |
| 2007/0101280 | A1 | 5/2007 | Paoli et al. |
| 2007/0118803 | A1 | 5/2007 | Walker et al. |
| 2007/0130504 | A1 | 6/2007 | Betancourt et al. |
| 2007/0186157 | A1 | 8/2007 | Walker et al. |
| 2007/0208606 | A1 | 9/2007 | MacKay et al. |
| 2007/0208769 | A1 | 9/2007 | Boehm et al. |
| 2008/0028340 | A1 | 1/2008 | Davis |

FOREIGN PATENT DOCUMENTS

| | | |
|---|---|---|
| EP | 0961197 | 12/1999 |
| EP | 1076290 | 2/2001 |
| EP | 1221661 | 7/2002 |
| JP | 5314152 | 11/1933 |
| JP | 63085960 | 4/1988 |
| JP | 401173140 A | 7/1989 |
| JP | 3191429 | 8/1991 |
| JP | 4225466 | 8/1992 |
| JP | 406014105 | 1/1994 |
| JP | 6139241 | 5/1994 |
| JP | 6180697 | 6/1994 |
| JP | 6180698 | 6/1994 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 | 6/2001 |
| WO | WO0157720 | 9/2006 |

OTHER PUBLICATIONS

"Architecture for a Dynamic Information Area Control" IBM Technical Disclosure Bulletin IBM Corp. New York US vol. 37 No. 10 Jan. 10, 1994. pp. 245-246.
Alschuler Liora "A tour of Xmetal" O'Reilly XML.COM 'Online Jul. 14, 1999 XP002230081 retrieved from the internet: <URL:http://www.xml.com/pub/a/SeyboldReport/ip0311025.html> retrieved on Feb. 5, 2003.
Au Irene et al. "Netscape Communicator's Collapsible Toolbars" CHI'98 Human Factors in Computing Systems Conference Proceedings Los Angeles CA Apr. 18-23, 1998 pp. 81-86.
Battle Steven A. et al.; "Flexible Information Presentation with XML" 1998 The Institution of Electrical Engineers 6 pages.
Brogden William; "Arbortext Adept 8 Editor Review". O'Reilly XML.COM 'Online! Sep. 22, 1999 XP002230080 retrieved from the Internet <URL:http://www.xml.com/pub/a/1999/09/adept/AdeptRvw.htm> retrieved on Feb. 5, 2003.
Chen Yi et al.: A; "XKvalidator: A Constraint Validator for XML" CIKM '-2 Nov. 4-9 2002 Copyright 2002 ACM 1-58113-492-4/02/0011 pp. 446-452.
Ciancarini Paolo et al.; "Managing Complex Documents Over the WWW: A Case Study for XML" IEEE Transactions on Knowledge and Data Engineering Vo.l. 11 No. 4 Jul./Aug. 1999. pp. 629-938.
Davidow ARI: Alle; "XML Editors: Allegations of Functionality in search of reality" Internet 'Online! 1999 XP002230082 retrieved from the Internet <URL:http://www.ivritype.com/xml/>.
Kanemoto Hirotaka et al; "An Efficiently Updatable Index Scheme for Structured Documents" 1998 IEEE pp. 991-996.
Sutanthavibul Supoj et al.; "XFIG Version 3.2 Patchlevel 2 (Jul. 2 1998) Users Manual (Edition 1.0)" Internet Document [Online] Jul. 2, 1998 XP002229137 Retrieved from the Internet: <URL:http://www.ice.mtu.edu/online_docs/xfig332/> [retrieved on Jan. 28, 2003].
Usdin Tommie et al.; Not a; "XML: Not a Silver Bullet But a Great Pipe Wrench" Standardview vol. 6. No. Sep. 3, 1998 pp. 125-132.
Chien Shu-Yao et al.; "Efficient Management of Multiversion Documents by Object Referencing" Proceedings of the 27th VLDB Conference 2001 pp. 291-300.
Chien Shu-Yao et al.; "Efficient schemes for managing mulitversion XML documents" VLDB Journal (2002) pp. 332-352.
Chien Shu-Yao et al.; "Storing and Querying Multiversion XML Documents using Durable Node Numbers" IEEE 2002 pp. 232-241.
Chien Shu-Yao et al.; "XML Document Versioning" SIGMOD Record vol. 30 No. 3 Spet 2001 pp. 46-53.
Dyck Timothy; "XML Spy Tops as XML Editor" http://www.eweek.com/article2/0395972404100.asp Nov. 25, 2002 4 pages.
Haukeland Jan-Henrick; "Tsbiff—tildeslash biff—version 1.2.1" Internet Document [Online] Jun. 1999 URL: http://web.archive.org/web/19990912001527/http://www.tildeslash.com/tsbiff//.
Nelson Mark; "Validation with MSXML and XML Schema" Windows Developer Magazine Jan. 2002 pp. 35-38.
Netscape Communication Corpora; "Netscape Communicator 4.61 for OS/2 Warp" Software 1999 The whole software release & "Netscape—Version 4.6 [en]-010615" Netscape Screenhot Oct. 2, 2002.
Noore A.; "A secure conditional access system using digital signature and encryption" 2003 Digest of Technical Papers. International Conference on Consumer Electronics Jun. 2003 pp. 220-221.
Rogge et al.; "Validating MPEG-21 Encapsulated Functional Metadata" IEEE 2002 pp. 209-212.
Wong Raymond K. et al.; "Managing and Querying Multi-Version XML Data with Update Logging" DocEng '02 Nov. 8-9 2002 Copyright 2002 ACM 1-58113-594-7/02/0011 pp. 74-81.
Cheng Ya Bing et al.; "Designing Valid XML Views" ER 2002 LNCS 2503 2002 Springer-Verlag Berlin Heidelberg 2002 pp. 463-477.
Chuang Tyng-Ruey; "Generic Validation of Structural Content with Parametric Modules" ICFP '01 Sep. 3-5, 2001 Copyright 2001 ACM 1-58113-415-0/01/0009 pp. 98-109.
Dayton Linnea and Jack Davis; "Photo Shop 5/5.5 WOW! Book" 2000 Peachpit Press pp. 8-17.
Hall Richard Scott; "Agent-based Software Configuration and Deployment" Thesis of the Univeristy of Colorado Online Dec. 31, 1999 retrieved from the Internet on Nov. 7, 2003: <http://www.cs.colorado.edu/users/rickhall/documents/ThesisFinal.pdf> 169 pages.
Hardy Mathew R. B. et al; "Mapping and Displaying Structural Transformations between XML and PDF" DocEng '02 Nov. 8-9 2002 Copyright 2002 ACM 1-58113-597-7/02/0011 pp. 95-102.
Kim Sang-Kyun et al.; "Immediate and Partial Validation Mechanism for the Conflict Resolution of Update Operations in XML Databases" WAIM 2002 LNCS 2419 2002 pp. 387-396 Springer-Veriag Berlin Heidelberg 2002.
Netscape Communication Corp; "SmartUpdate Developer's Guide" Online Mar. 11, 1999 retrieved from the Internet on Dec. 8, 2000: <http://developer.netscape.com:80/docs/manuals/communicator/jarman/index.htm> 83 pages.
Tomimori et al.; "An Efficient and Flexible Access Control Framework for Java Programs in Mobile Terminals"; 22nd International Conference on Distributed Computing Systems Workshops; 2002; pp. 777-782.
Van Hoff Arthur et al.; "The Open Software Description Format" Online Aug. 13, 1997 retrieved from the Internet on Nov. 7, 2003: <http://www.w3.org/TR/NOTE-OSD> 11 pages.
Verlamis Iraklis et al.; "Bridging XML-Schema and relational databases. A System for generating and manipulating relational databases using valid XML documents." DocEng '01 Nov. 9-10, 2001 Copyright 2001 ACM 1-58113-432-0/01/0011 pp. 105-114.
Williams Sara and Charlie Kin; "The Component Object Model A Technical Overview" Oct. 1994 Microsoft Corp. pp. 1-14.
Pacheco et al., "Delphi 5 Developers Guide," Sams Publishing, 1999, Chapter 31 Section: Data Streaming, 6 pages.
"Netscape window," Netscape Screenshot Oct. 2, 2002.
Clarke P., "From small beginnings" Knowledge Management Nov. 2001, pp. 28-30.
Hwang et al., "Micro-Firewalls for Dynamic Network Security with Distributed Intrusion Detection"; IEEE International Symposium on Network Computing and Applications; 2001; pp. 68-79.
Kaiya et al., "Specifying Runtime Environments and Functionalities of Downloadable Components Under the Sandbox Mode"; International Symposium on Principles of Software Evolution; 2000; pp. 138-142.
Komatsu N. et al., "A Proposal on Digital Watermark in Document Image Communication and Its Application to Realizing a Signature" Electronics and Communications in Japan Part I: Communications vol. 73 No. 5, May 1990, pp. 22-33.
Sun Q. et al., "A robust and secure media signature scheme for JPEG images" Proceedings of 2002 IEEE Workshop on Multimedia Signal Processing, Dec. 2002, pp. 296-299.
Prevelakis et al., "Sandboxing Applications"; Proceedings of the FREENIX Track; 2001; pp. 119-126.
Schmid et al., "Protection Data from Malicious Software"; 18th Annual Computer Security Applications Conference; 2002; pp. 199-208.
Trupin J., "The Visual Programmer," Microsoft Systems Journal, Apr. 1996, pp. 103-105.
Zdonik S., "Object Management System Concepts," ACM, 1984, pp. 13-19.
"Store and Organize Related Project Files in a Binder," Getting Results with Microsoft Office, 1990, pp. 109-112.
Barker et al., "Creating In-Line Objects Within An Integrated Editing Environment," IBM Technical Disclosure Bulletin, vol. 27, No. 5, Oct. 1984, p. 2962.
Berg A., "Naming and Binding: Monikers" Inside OLE, 1995, Chapter 9, pp. 431-490.
Clapp D., "The NeXT Application Kit Part I: Non-Responsive Classes," the NeXT Bible 1990, Chapter 16, pp. 275-293.
DiLascia et al., "Sweeper" Microsoft Interactive Developer, vol. 1, No. 1, 1996, 27 pages.
Herzner et al., "CDAM- Compound Document Access and Management. An Object-Oriented Approach" Multimedia Systems Interaction and Applications, 1992, Chapter 3, pp. 17-36.
Kobayashi et al., "An Update on BTRON-specification OS Development" IEEE 1991 pp. 132-140.
Peterson B. , "Unix Variants," Unix Review, vol. 10, No. 4, Apr. 1992, pp. 29-31.

Pike et al., "Plan 9 from Bell Labs" UKUUG, Summer 1990, 10 pages.
Pike et al., "The Use of Name Spaces in Plan 9," Operating Systems Review vol. 27, No. 2, Apr. 1993, pp. 72-76.
Staneck W., "Internal and External Media" Electronic Publishing Unleashed, 1995, Chapter 22, pp. 510-542.
Clark James—W3C Editor; "XSL Transformation (XSLT) Verison 1.0" Nov. 16, 1999 W3C (MIT INRIA Kejo) pp. 1-156.
Description of Whitehill Composer software product producted by Whitehill Technologies Inc. available at <http://www.xml.com/pub/p/221> accessed on Apr. 8 2004, two pages.
McCright J.S.; "New Tool Kit to Link Groove with Microsoft Sharepoint" eWeek Enterprise News & Reviews Ziff Davis Media INc. Jul. 29, 2002 1 page.
Musgrave S; "Networking technology—impact and opportunities" Survey and Statistical Computing 1996. Proceedings of the Second ASC International Conference. Sep. 1996. pp. 369-378. London UK.
Rapaport L; "Get more from SharePoint" Transform Magazine vol. 11 No. 3. Mar. 2002 pp. 1315.
W3C Editor James Clark and Ste; "XML Path Language (XPath) Version 1.0" Nov. 16, 1999W3C (MIT INRIA Kejo) pp. 1-49.
OMG XML Metadata Interchange (XMI) Specification Version 1.2 Jan. 2002.
Laura Acklen & Read Gilgen, "Using Corel Wordperfect 9", 251-284, 424-434, 583-586 (1998).
Bruce Heiberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.
LeBlond et al, "PC Magazine Guide to Quattro Pro for Windows", pp. 9-11, 42-61, Ziff-Davis Press, Copyright 1993 by the LeBlond Group.
Mansfield, "Excel 97 for Busy People", Published by Osborne/Mcgraw-Hill 1997 pp. 48-50.
"Microsoft Visual Basic 5.0 Programmer's Guide 1997"; pp. 578-579; Redmond WA 98052-6399.
Han et al., WebSplitter: A Unified XML Framework for Multi-Device Collaborative Web Browsing, 2000, ACM Conference on Cimputer Supported Cooperative Work, 10 pages.
IBM: Stack Algorithm for Extractin Subtree from Serialized Tree, Mar. 1, 1994, TDB-ACC-NONN94033, 3 pages.
Atova, "User Reference manual Version 4.4, XML Spy suite 4.4," Atova Ges.m.b.H and Altova, Inc., May 24, 2002, pages. cover, copyright p., 1-565.
Altova et al. XML Spy, XML integrated Development Environments, Altova Inc., 2002, pp. 1-18.
Ben-Natan, U.S. Appl. No. 60/203,081, filed May 9, 2000, entitled "Internet platform for creating and supporting communities".
Ixia Soft, "Steamlining content creation, retrieval, and publishing on the Web using TEXTML Server and SML Spy 4 Suite in an integrated, Web publishing environment," (Partners's Whitepaper, published on the Web as of Jun. 6, 2002, downlowad pp. 1-16.
Kutay, U.S. Appl. No. 60/209,713 filed Jun. 5, 2000, entitled, "Methods and systems for accessing, organizing presenting and viewing data".
Microsoft Word 2000 (see Screen Shot "About Microsoft Word") Published 1983-1999 and Microsoft Excel 2000 (see Screen Shot "About Microsoft Excel") Published 1988-1999, Three pages.
Moore, U.S. Appl. No. 60/191,662 filed Mar. 23, 2000, entitled "Collection-based presistent digital archives".
Altova, et al., "User and Reference Manual Version 4.4", www.xmlspy.com, (May 24, 2007),1-565.
Grosso, et al., "XML Fragment Interchange", W3C,(Feb. 2001),1-28.
Altova, Inc., "XML Spy 4.0 Manual," Altova Inc. & Altova GmbH, coyright 1998-2001, Chapters 1, 2, and 6, encompassing pp. 1-17, 18-90, and 343-362.
Cybook, Inc.: "Copying the Search Form to Services-based Web Sites" INtemet Article, (online) Jul. 26, 2004.*the whole document*.
Excel Developer Tip (hereinafter "Excel"), "Determining the Data Type of a Cell", May 13, 1998, p. 1 (available at http://jwalk.com/ss//excel/tips/tip62.htm).
Macromedia, INC.: "Dreamweaver Technote, Changes in copying and pasting in Dreamweaver 4" Internet Article (online). *the whole document*.
Rado, Dave: "How to create a template that makes it east for users to "fill in the blanks", without doing any programming" Microsoft Word MVP FAQ Site, (online) Apr. 30, 2004, the whole document.
Cover, XML Forms Architecture, retrieved at << http://xml.coverpages.org/xfa.html>> on Aug. 17, 2006, Coverpages, Jun. 16, 1999.
Raggett, "HTML Tables", retrieved on Aug. 6, 2006, at <<http:www://is-edu.hcmuns.edu.vn/WebLib/books/Web/Tel/html3-tables.html>>, W3C Internet Draft, Jul. 7, 1995, pp. 1-12.
"Webopedia Computer Dictionary" retrieved on May 9, 2006, at <<http://www.pewebopedia.com/TERM/O/OLE.html>>, Jupitermedia Corporation, 2006, pp. 07.
Pacheco, Xavier et al., "Delphi 5 Developers Guide", Sams Publishing. Chapter 31, Section: Data Streaming,(1999),4.
Microsoft Corporation, "Microsoft Computer Dictionary" Microsoft Press, Fifth Edition, p. 149.
Borland, Russo "Running Microsoft Word 97", 314-315, 338, 361-362, 390, and 714-719.
"Microsoft Word 2000", Screenshots,(1999),1-5.
Beauchemin, Dave "Using InfoPath to Create Smart Forms", Retrieved from the Internet at http:/www.microsoft.com/office/infopath/prodinfo/using.mspx on Jan. 21, 2007,(Mar. 27, 2003).
Begun, Andrew et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007, (Aug. 2004).
Dubinko, Micah "XForms and Microsoft InfoPath", Retrieved from the Internet at http://www.xml.com/lpt/a/1311 on Jan. 21, 2007,(Oct. 29, 2003).
Udell, Jon "InfoPath and XForms", Retrieved from the Internet at http://weblog.infoworld.com/udell/2003/02/26.html,(Feb. 26, 2003).
Hoffman, Michael "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).
Singh, Darshan "Microsoft InfoPath 2003 by Example", Retrieved from the Internet at http://www.perfectxml.com/InfoPath.asp on Jan. 21, 2007,(Apr. 20, 2003).
Raman, T. V., et al., "XForms 1.0", (Dec. 2001),Section 1-12.2.3 & Appendices A-G.
"Enter Key", Retrieved from the Internet at http://systems.webopedia.com/TERM/Enter_key.html on Dec. 20, 2006.
Lehtonen, Miro et al., "A Dynamic User Interface for Document Assembly", Department of Computer Science, University of Helsinki,(Nov. 2002).
Rees, Michael J., "Evolving the Browser Towards a Standard User Interface Architecture", School of Information Technology, Bond University, Australia,(2001).
"Microsoft Visual Basic 5.0 Programmers Guide", *Microsoft Press*, (1997),pp. 42-43, 54-58.
Nelson, Joe "Client-side Form Validation Using JavaScript", *Developer Advisory*, (Sep. 21, 2001).
Brabrand, et al., "Power Forms Declarative Client-side Form Field Validation", (2002),1-20.
Anat, Eyal et al., "Integrating and Customizing Hererogeneous E-Commerce Applications", The VLDB Journal—The International Journal on Very Large Data Bases, vol. 10, Issue 1,(Aug. 2001),16-38.
Adams, Susie et al., "BizTalk Unleashed", Sams publishing, 2002, first printing Mar. 2001, 1-2, 31-138.
Vasters, Clemens F., "BizTalk Server 2000 a Beginners Guide", Osborne/McGraw-Hill,(2001),1-2, 359-402.
Halberg, Bruce et al., "Using Microsoft Excel 97", (1997),191-201, 213-219.
Villard, et al., "An Incremental XSLT Transformation Processor for XML Document Manipulation", http://www2002.org/CDROM/refereed/321, Printed on May 18, 2007,(May 2002),25 pages.
"Microsoft Word 2000 Screenshots", (2000),11-17.

XMLPSY, "XmlSpy 2004 Enterprise Edition Manual", Altova,(May 17, 2004),1-25, 220-225.
StylusStudio, "StylusStudio: XPath Tools", 2004-2007, StylusStudio,1-14.
Dodds, "Toward an XPath API", xml.com,(May 7, 2001),1-3.
Altova, "Altova Tools for XPath 1.0/2.0", Altova,1-12.
"Microsoft Word 2000 Screenshots", Word,(2000),1-17.
Bradley, Neil "The XML Companion, Third Edition", *Published by Addison Wesley Professional*, http://proquest.safaribooksonline.com0201770598, http,(Dec. 12, 2001),1-18.
Klarlund, Nils "DSD: A Schema Language for XML", *ACM, FSMP Portland Oregon*. (2000),101-111.
Watt, Andrew "Microsoft Office Infopath 2003 Kick Starr", (*Published by Sams) Print ISBN-10:0-672-32623-X*, (Mar. 24, 2004),1-57.
Hu, et al., "A Programmable Editor for Developing Structured Documents based on Bidirectional Transformations", ACM,(Aug. 2004),178-179.

* cited by examiner

RECURSIVE SECTIONS IN ELECTRONIC FORMS

TECHNICAL FIELD

This invention relates to recursive sections in electronic forms.

BACKGROUND

Electronic data-entry forms are commonly used to collect information. These electronic forms enable users to enter data and have that data stored digitally, such as in computer-accessible databases. Data so stored can be quickly retrieved, allowing others to use that data.

In some cases, it is useful for electronic data-entry forms to include recursive sections. These sections may permit nested sets of similar information to be entered, each section being governed similarly by a schema governing the electronic form.

Assume, for example, that a user of an electronic form wishes to enter names and email addresses for employees that are within a management hierarchy. To do so, a group of recursive sections may be used, each of which enables the user to enter the needed information for each employee within the hierarchy.

Building recursive sections into an electronic data-entry form, however, can require significant time and computer-programming skill. A person often needs to have extensive training and experience in computer programming before he or she can build recursive sections into an electronic data-entry form. Even with extensive training, this programmer may need many hours to build and maintain these recursive sections.

Further, these recursive sections may be limited by the electronic form. Assume, for example, that the programmer thought that the form's user would need to have up to three levels of hierarchy in a management structure, each having up to five employees, and built the electronic form to reflect the recursive sections accordingly. The electronic form may work for a sales team having one president, two sales managers below the president, and five salesmen below the sales managers. If the form's user, however, needs to enter into the form a sixth salesman or a salesman's assistant (a fourth level of management hierarchy), the form may no longer be capable of handling the management structure needed by the user. In this case, the programmer may have to go back and re-design the electronic form.

Alternatively, a programmer may design an electronic form to enable additional flexibility by permitting a user to add recursive sections to an electronic form; to add these recursive sections, however, a user may need to do so through a potentially confusing and difficult-to-manage hierarchical representation of the electronic form's data structure. In this case, for example, a user may need to view and understand a hierarchical tree representation of the electronic form, select a particular node or hierarchical level of the tree, and insert a representation of a recursive structure at that particular node or level. Not only is this way of adding recursive sections potentially confusing and difficult, it may permit the user to improperly insert the recursive structure. If the user inserts the structure improperly, the altered data structure of the electronic form may be invalid to its governing schema. An electronic form invalid to its schema may be useless.

Given the foregoing, there is a need in the art for a more user-friendly and/or less time-consuming way to build and/or use recursive sections for electronic data-entry forms.

SUMMARY

Systems and/or methods ("tools") enabling creation and/or use of recursive sections for an electronic data-entry form are described.

BRIEF DESCRIPTION OF THE DRAWINGS

The same numbers are used throughout the disclosure and figures to reference like components and features.

DETAILED DESCRIPTION

Overview

Tools described below enable creation and/or use of recursive sections for an electronic data-entry form.

The tools, in one embodiment, enable a recursive section to be built into an electronic form graphically, such as through enabling a form designer to graphically select a component representing the recursive section. By so doing, the tools may enable form designers to quickly and easily create recursive sections for electronic forms without needing to write script or have extensive programming experience.

The tools also, in another embodiment, enable users of an electronic form to modify recursive sections in an electronic form through a data-entry and/or rendered view of the electronic form. In this way, the tools may enable a user to alter recursive sections through a view of the form in which the user may be most familiar.

The tools may also, in another embodiment, enable creation and/or use of recursive sections in an electronic form that permit a user to add an arbitrary number or level of recursive sections to the electronic form.

In still another embodiment, the tools enable a user to add recursive sections to an electronic form while ensuring that the form remains valid to its governing schema.

Architecture

Figure 1:
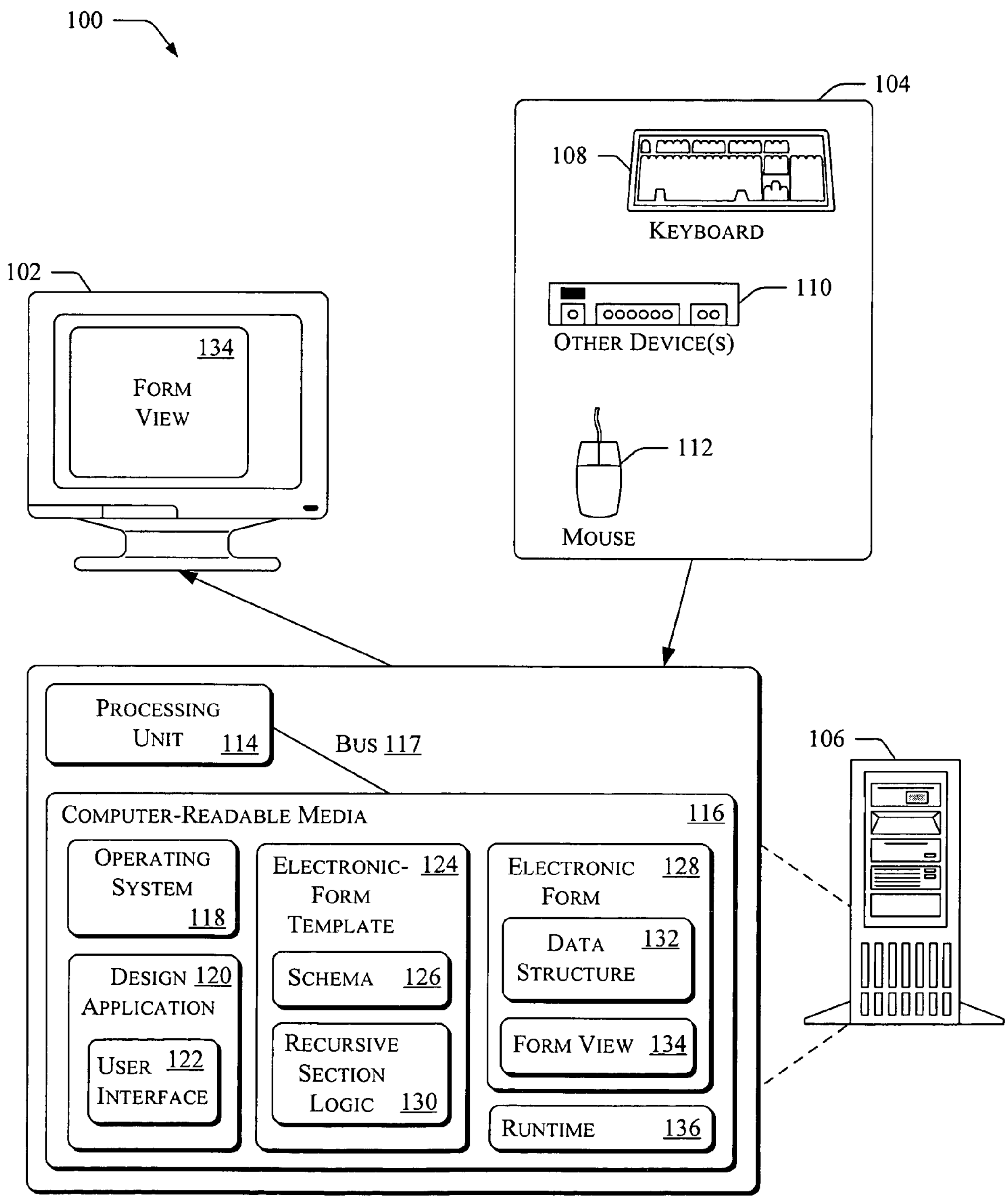
FIG. 1 illustrates an exemplary architecture capable of facilitating creation and/or use of recursive sections in an electronic form.

An exemplary architecture 100 capable of facilitating creation and/or use of a recursive section is shown FIG. 1. This architecture is set forth as one example of a computer architecture in which the tools may be implemented. The architecture 100 comprises a display 102, one or more user-input devices 104, and a computer 106. The user-input devices 104 comprise any device allowing a computer to receive a designer's or user's preferences, such as a keyboard 108, other device(s) 110 (e.g., a touch screen, a voice-activated input device, a track ball, etc.), and a mouse 112. The computer comprises a processing unit 114 capable of executing computer-readable media 116 communicated to the processing unit through a bus 117.

The computer-readable media comprises an operating system 118 and one or more applications stored in memory and executable by the processing unit. One particular application is a design application 120, which may allow a form designer to create recursive sections for an electronic form with little or no programming skill. The design application is capable of providing a visual what-you-see-is-what-you-get (WYSIWYG) user interface 122 that, in one embodiment, enables designers to graphically construct recursive sections by visually selecting graphics and arranging them in a manner that can be intuitive and straight forward.

An electronic-form template 124 is also shown. This template comprises a schema 126 governing electronic form 128, and recursive section logic 130. The recursive section logic may be part of or separate from the template. The electronic form comprises a data structure 132 and a form view 134. The data structure may be arranged hierarchically and comprise nodes. The data structure may also be transformed to render the form view, which enables data entry into the electronic form. In one embodiment, the data structure comprises eXtensible Markup Language (XML) and can be transformed with an eXtensible Style-sheet Language Transformation (XSLT) to produce HyperText Machine Language (HTML) that is viewable and through which a user can enter information.

The computer-readable media also comprises a runtime application 136. The runtime is capable of enabling a user's interaction with the electronic form, and may include a user interface.

Recursive Sections

Generally, a recursive section in the context of electronic forms comprises a section capable of containing or referencing an instance of itself. In some cases, a recursive section can contain an instance of itself as a direct child or a descendant. In some others, it can reference an instance of itself as a child or descendant as a choice.

Electronic forms described herein may provide multiple, substantially similar data-entry sections into which a user may enter and view information. These data-entry sections may correspond to a recursive section and instances of that recursive section, though each may appear different in some fashion. The schema governing and/or the logic directing the operation of these data-entry sections may, however, be identical.

An electronic form having three levels of recursion, for instance, may provide data-entry sections each having the same data-entry fields, though the orientation, color, accompanying text, and the like may be different. For example, the first level may be oriented to the left of the page and have accompanying text of "President", as a highest level of an employee management structure. The second level may be oriented slightly right of the first level and have accompanying text of "Vice President". Likewise, the third level may be oriented further right and have accompanying text of "Manager".

Building Recursive Sections

Figure 2:
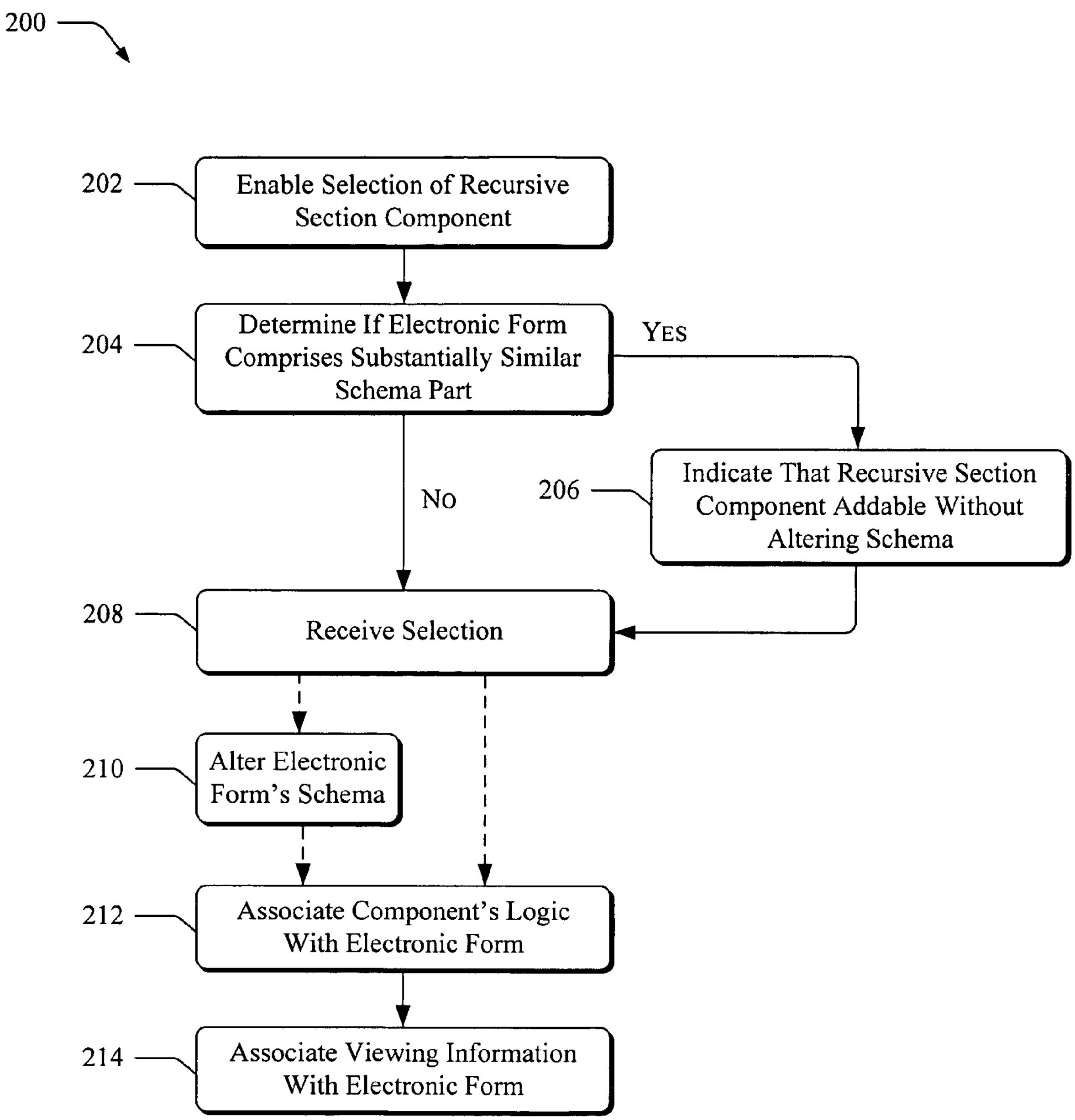
FIG. 2 sets forth a flow diagram of an exemplary process for building recursive sections.

An exemplary process 200 enabling a form designer to build a recursive section into an electronic data-entry form is shown in FIG. 2. The process 200 is illustrated as a series of blocks representing individual operations or acts performed by components of architecture 100, such as design application 120 and/or its user interface 122. This and other processes described herein may be implemented in any suitable hardware, software, firmware, or combination thereof. In the case of software and firmware, these processes represent sets of operations implemented as computer-executable instructions.

At block 202, design application 120 enables selection of a recursive section component. This component may be selected graphically, such as by dragging and dropping it from one region of display 102 to another, for instance. It can also be selected (graphically or otherwise) through a dialog menu or in other appropriate ways.

Figure 3:
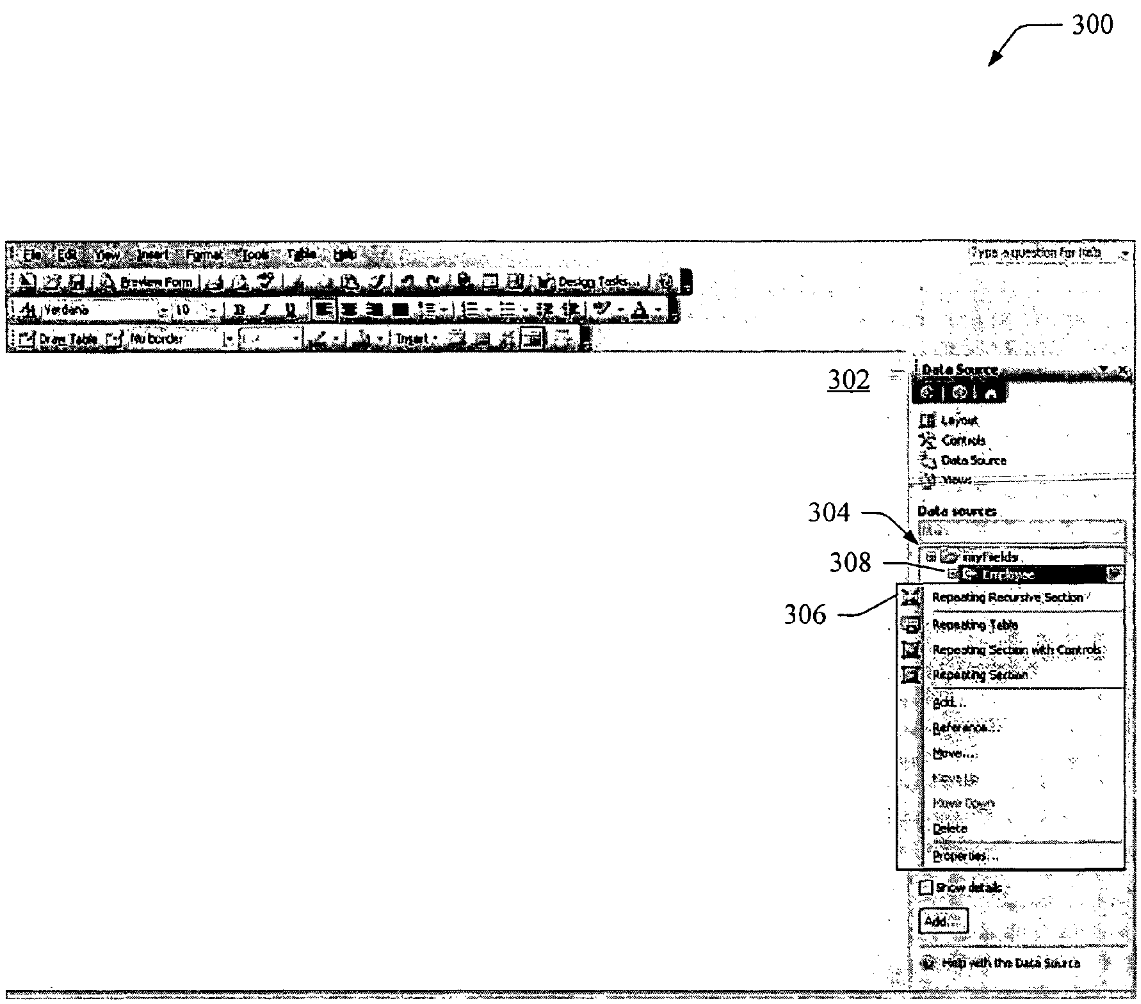
FIG. 3 illustrates an exemplary and empty form-design area.

In an illustrated embodiment, the design application enables graphical selection of a recursive section component without writing script or code, as illustrated in a screen shot 300 of FIG. 3. This screen shot sets forth an exemplary form-design area 302 capable of showing a what-you-see-is-what-you-get (WYSIWYG) representation of a selected recursive section component, a hierarchical representation 304 (entitled "data source") of an electronic form from which a node may be selected at which the recursive section may be associated or a position at which a node corresponding to the selected component may be placed, and a selectable recursive section component 306 (entitled "Repeating Recursive Section").

At block 204, the design application may determine whether or not the electronic form comprises a schema part that is substantially similar to a schema construct that may be added when a recursive section component is selected. In some cases an electronic form being designed already comprises a schema, which may have a part or parts that is substantially similar to a schema construct for a recursive section component. If the design application determines that the electronic form being designed comprises such a schema part, it proceeds to block 206. Otherwise, it proceeds to block 208.

At block 206, the design application indicates that this recursive section component may be selected without altering the schema of the electronic form. This may be useful when a designer does not wish to alter a schema of an electronic form but does wish to alter how the electronic form behaves. By so doing, this process 200 permits an existing electronic form that has a schema matching an industry or company standard (and so should not be changed) to have its behavior (e.g., logic or view) but not its schema altered.

At block 208, the design application receives a form designer's selection. In the ongoing illustrated embodiment shown in FIG. 3, the design application receives a selection of an employee node 308 and recursive section component 306. The design application is capable of associating the selected recursive section component with the selected employee node.

Figure 4:
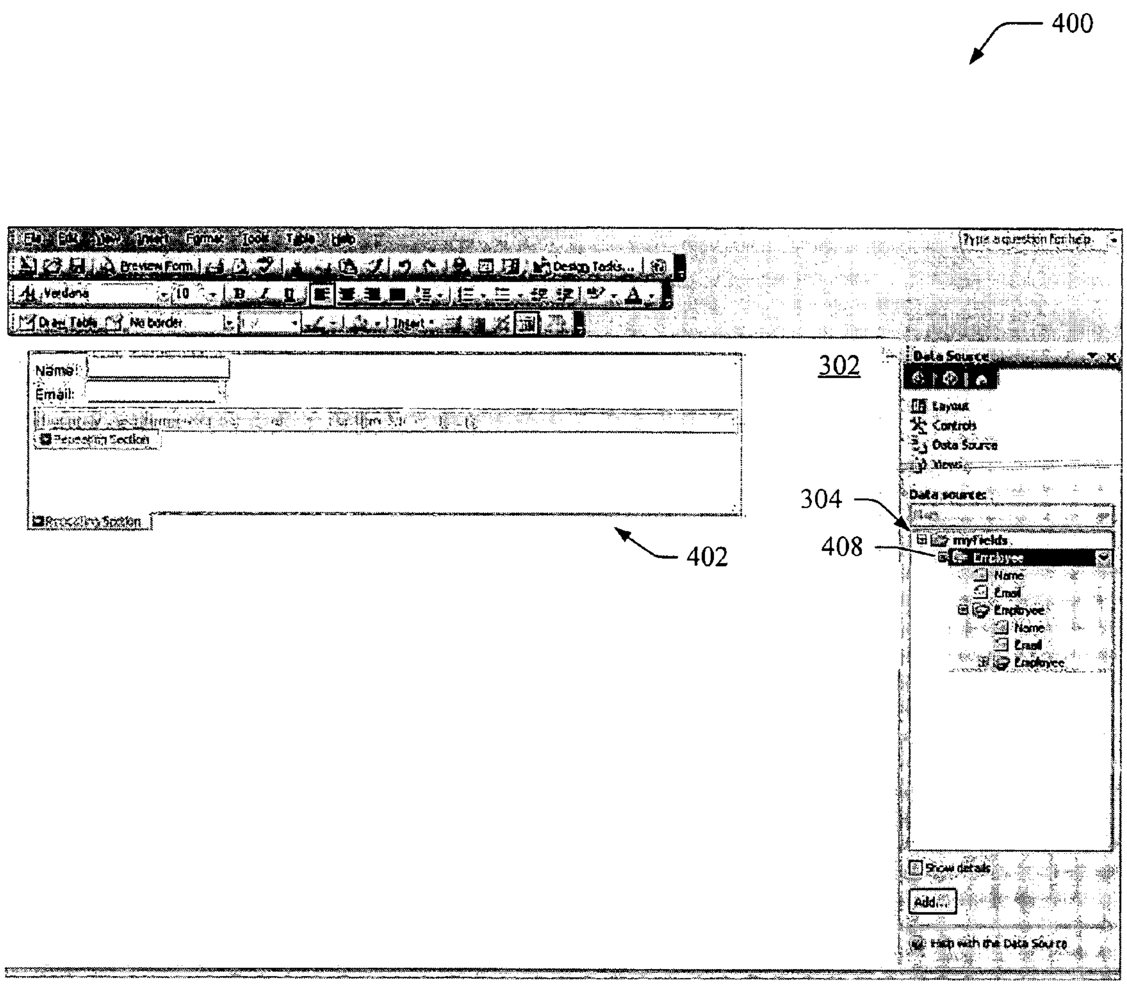
FIG. 4 illustrates the form-design area of FIG. 3 showing an exemplary control.

In the ongoing illustrated embodiment, the design application indicates a selection of the form designer graphically, in this case in a WYSIWYG way by presenting a control approximating what a user of the form may see when editing the form (an "editable view"). FIG. 4 sets forth this exemplary presentation with screen shot 400 showing control 402 associated with the selected recursive section in the form-design area 302.

In one embodiment, the form designer is also enabled to customize the user's experience, such as by selecting: concentric boxes for recursive sections based on their hierarchy; text or other user interfaces to aid the user that may also be dependent on the level of the hierarchy; and the like. Thus, a form designer may select that a first level employee have an outer concentric box and text of "employee", and each successive level employee have an inner concentric box for each level and a "sub" before "employee" also for each level.

Following block 208, the design application may proceed to block 210 or, if the designer selected to not alter the electronic form's schema, to block 212.

At block 210, the design application may alter the electronic form's schema to permit a recursive section. The design application may alter the electronic form's schema at a location in the schema at which a component is selected, such as at the employee node selected in the illustrated embodiment.

Continuing this embodiment, the design application alters the electronic form's schema 126 of FIG. 1 by adding a schema construct associated with the selected recursive section component. This schema construct may govern the recursive section of the electronic form and may permit an arbitrary number and/or level of instances contained by or referencing the recursive section. This arbitrary number and/or level may permit, for example, a user of the electronic form to enter information for many employees and to many levels of hierarchy without the electronic form being invalid.

The design application adds the following schema construct (here in XML schema, “XSD”) to the electronic form's schema in the illustrated embodiment:

```
<?xml version=“1.0” encoding=“UTF-8” standalone=“no” ?>
<xsd:schema
targetNamespace=“http://schemas.microsoft.com/office/infopath/2003
/myXSD/2004-08-30T18:16:22”
xmlns:my=“http://schemas.microsoft.com/office/infopath/2003/myXSD/
2004-08-30T18:16:22” xmlns:xsd=“http://www.w3.org/2001/
XMLSchema”>
    <xsd:element name=“myFields”>
        <xsd:complexType>
            <xsd:sequence>
                <xsd:element ref=“my:Employee” minOccurs=“0”
maxOccurs=“unbounded”/>
            </xsd:sequence>
            <xsd:anyAttribute processContents=“lax”
namespace=“http://www.w3.org/XML/1998/namespace” />
        </xsd:complexType>
    </xsd:element>
    <xsd:element name=“Employee”>
        <xsd:complexType>
            <xsd:sequence>
                <xsd:element ref=“my:Name” minOccurs=“0” />
                <xsd:element ref=“my:Email” minOccurs=“0” />
                <xsd:element ref =“my:Employee” minOccurs=“0”
maxOccurs=“unbounded” />
            </xsd:sequence>
        </xsd:complexType>
    </xsd:element>
    <xsd:element name=“Name” type=“xsd:string” />
    <xsd:element name=“Email” type=“xsd:string” />
</xsd:schema>
```

At block 212, the design application associates logic with the electronic form that is capable of guiding how the recursive section is used during editing. If the design application skipped block 210, this logic may be associated with the existing schema part determined at block 204.

In the illustrated embodiment, this logic is mapped one-to-one to the schema construct for the selected recursive section component. This logic is added to recursive section logic 130 of electronic form template 124 of FIG. 1. The design application adds the logic set forth below (here written in XML) to the electronic form template. The first “xsf:xmlToEdit” section set forth below governs the outer instance and the second “xsf:xmlToEdit” section governs all inner (sub-hierarchical or nested) instances.

```
<xsf:editing>
    <xsf:xmlToEdit name=“Employee_1”
item=“/my:myFields/my:Employee” container=“/my:myFields”>
        <xsf:editWith caption=“Employee”
xd:autogeneration=“template” component=“xCollection”>
            <xsf:fragmentToInsert>
                <xsf:chooseFragment innerFragment=
                “my:Employee”>
                    <myEmployee>
                        <my:Name></my:Name>
                        <my:Email></my:Email>
                    </my:Employee>
                </xsf:chooseFragment>
            </xsf:fragmentToInsert>
        </xsf:editWith>
    </xsf:xmlToEdit>
    <xsf:xmlToEdit name=“Employee_2”
item=“/my:myFields//my:Employee//my:Employee”
container=“/my:myFields//my:Employee”>
        <xsf:editWith caption=“Sub Employee”
xd:autogeneration=“template” component=“xCollection”>
            <xsf:fragmentToInsert>
                <xsf:chooseFragment innerFragment=
                “my:Employee”>
                    <my:Employee>
                        <my:Name></my:Name>
                        <my:Email></my:Email>
                    </my:Employee>
                </xsf:chooseFragment>
            </xsf:fragmentToInsert>
        </xsf:editWith>
    </xsf:xmlToEdit>
</xsf:editing>
```

At block 214, the design application may associate with the electronic form viewing information associated with a recursive section component. This viewing information may provide additional information guiding how the selected recursive section is viewed by a user. This viewing information is available to runtime 136 of FIG. 1 during editing of the electronic form.

Continuing the illustrated embodiment, the design application may add the following viewing information (here an extensible Stylesheet Language (XSL) transformation), to the electronic form template:

```
<xsl:template match=“my:myFields”>
    <html>
        <body>
            <div><xsl:apply-templates select=“my:Employee”
mode=“_3”/>
                <div class=“optionalPlaceholder”
xd:xmlToEdit=“Employee_1” tabIndex=“0”
xd:action=“xCollection::insert” align=“left” style=“WIDTH:
651px”>Insert item</div>
            </div>
            <div> </div>
        </body>
    </html>
</xsl:template>
<xsl:template match=“my:Employee” mode=“_3”>
    <div class=“xdRepeatingSection xdRepeating” title=“ ”
style=“MARGIN-BOTTOM: 6px; WIDTH: 651px” align=“left”
xd:CtrlId=“CTRL7” xd:xctname=“RepeatingSection” tabIndex=“−1”>
        <div>Name:<span class=“xdTextBox” hideFocus=“1” title=“ ”
xd:CtrlId=“CTRL8” xd:xctname=“PlainText” tabIndex=“0”
xd:binding=“my:Name” style=“WIDTH: 130px”>
                <xsl:value-of select=“my:Name”/>
            </ span>
        </div>
        <div>Email:<span class=“xdTextBox” hideFocus=“1” title=“ ”
xd:CtrlId=“CTRL9” xd:xctname=“PlainText” tabIndex=“0”
xd:binding=“my:Email” style=“WIDTH: 130px”>
                <xsl:value-of select=“my:Email”/>
```

-continued

```
            </ span>
        </ div>
        <div><xsl:apply-templates select="my:Employee"
mode="_3"/>
            <div class="optionalPlaceholder"
xd xmlToEdit="Employee_2" tabIndex="0"
xd:action="xCollection::insert" align="left" style="WIDTH:
100%">Insert item</div>
        </div>
        <div> </div>
        <div> </div>
        <div> </div>
    </div>
</xsl:template>
```

Exemplary User Interaction

Figure 5:
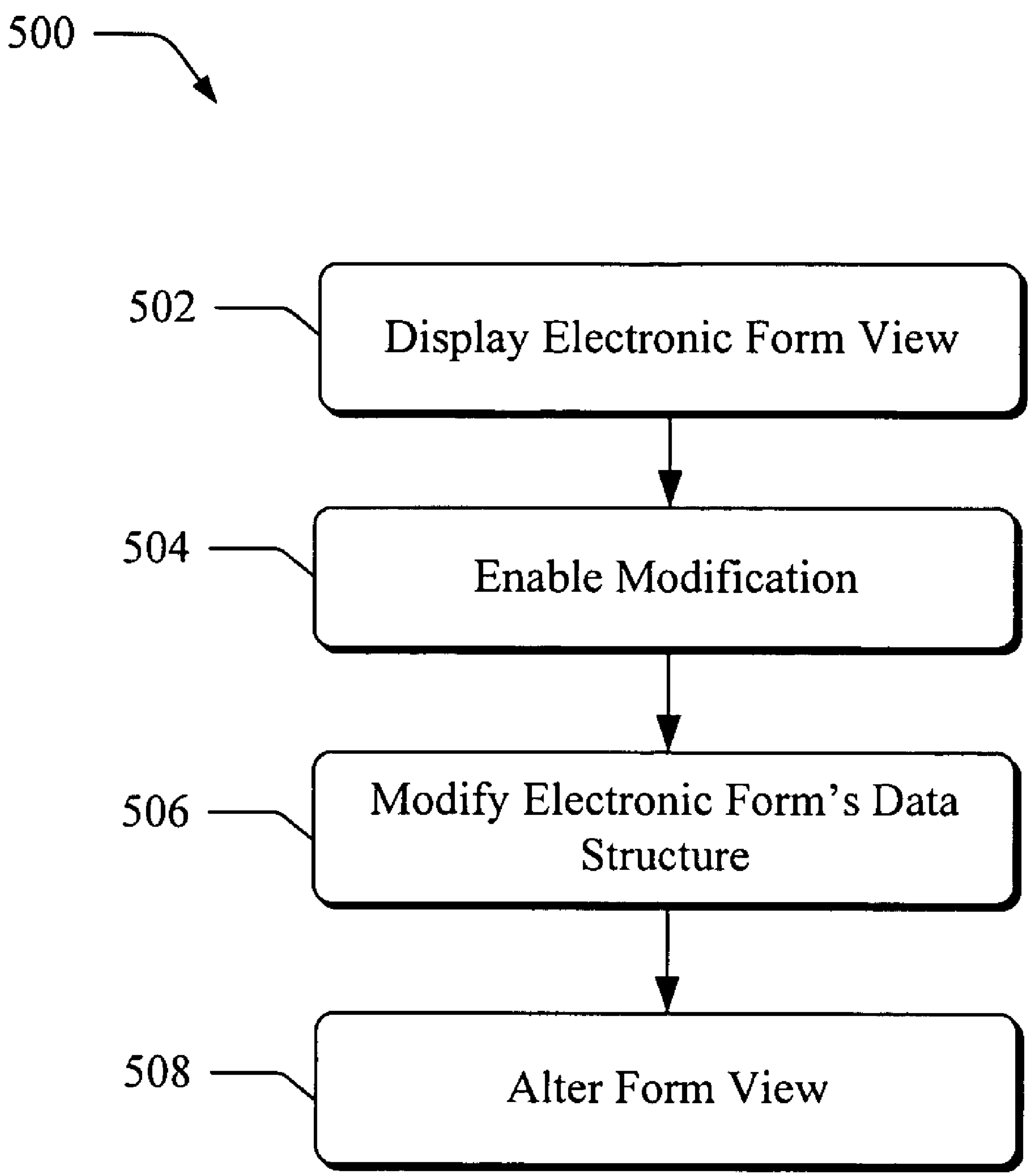
FIG. 5 sets forth a flow diagram of an exemplary process for enabling a user to add or alter recursive sections.

Referring to FIG. 5, an exemplary process 500 enabling a user to modify a recursive section in an electronic form is shown. The process 500 is illustrated as a series of blocks representing individual operations or acts performed by components of architecture 100, such as runtime 136 and electronic form template 124. Electronic forms in which a user may modify a recursive section according to the process 500 may comprise, for instance, those with recursive sections built according to process 200 above or electronic forms built in other ways and governed by a schema permitting recursive sections, such as some electronic forms that follow an industry standard.

At block 502, a view of an electronic form having a schema permitting recursive sections is displayed. This view may be editable by a user and/or comprise a rendering of an electronic form's data structure, such as a transformation of data structure 132 of FIG. 1. In one embodiment, this view comprises data-entry fields or otherwise enables a user to enter data.

Figure 6:
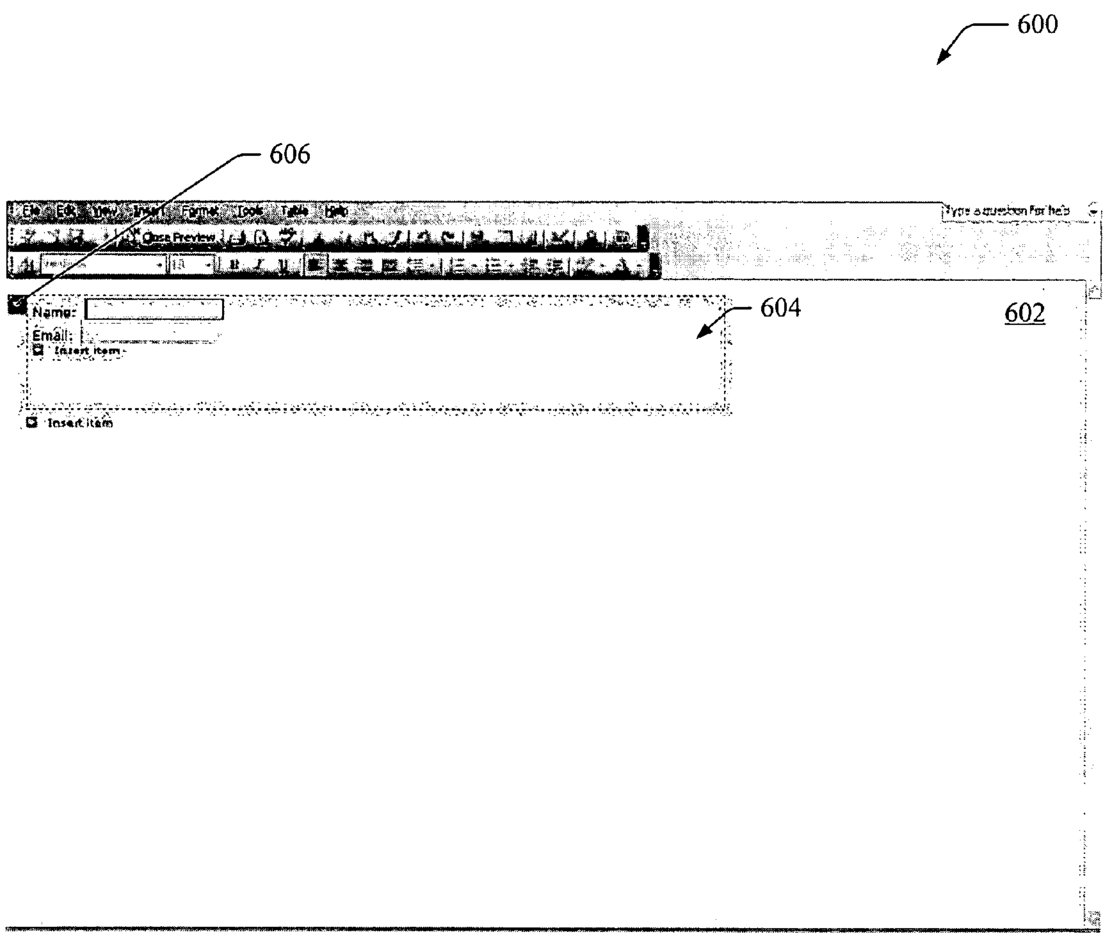
FIG. 6 illustrates an exemplary rendered view of an electronic form having a recursive section.

Continuing the illustrated embodiment above, a screen shot 600 showing a rendered view 602 is set forth in FIG. 6. This view shows a recursive section 604 presented in HTML, which is an XSL transformation of an XML data structure in the electronic form for the recursive section.

At block 504, a user is enabled to modify a recursive section. The user may, in one embodiment, be enabled to add recursive sections to an arbitrary number and/or level of hierarchy. Thus, the runtime may permit a user to add recursive sections at the same or an arbitrary level below a recursive section over and over again. Constraints of the schema may be determined in part based on the form's schema and/or recursive section logic 130 of FIG. 1.

Also, the user may be able to modify the recursive section graphically while maintaining the form's validity to its schema. The modifications to the recursive section may be constrained so that a user is not enabled to perform a modification that is not permitted by a schema governing the electronic form. The runtime may determine what modifications are permitted in part based on the recursive section logic. Based on this information, the runtime may orient where in a view the user is enabled to modify the recursive section.

Graphical interaction may be enabled through an editable, rendered view of the electronic form. By so doing, a user is enabled to interact with the form through a view in which the user may be familiar. Also, by so doing, the user may not have to switch out of the editable view to modify the recursive section.

Continuing the illustrated embodiment, the rendered view shown in FIG. 6 comprises a recursive selection button 606. Responsive to receiving a user's selection of this button, the runtime may present additional options to the user. These options may enable the user to add, delete, or alter a recursive section. The user may also be enabled to select in which way he or she wishes a recursive section to be added.

Figure 7:
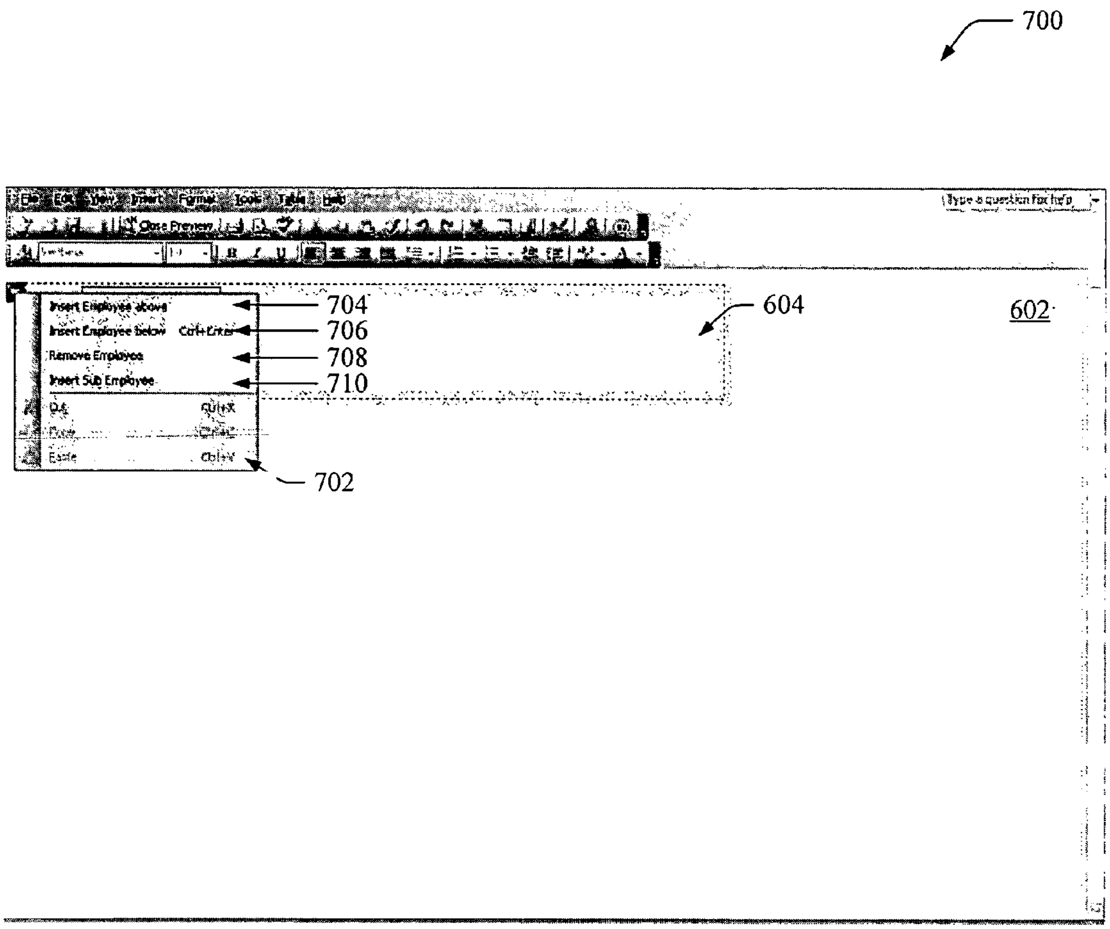
FIG. 7 illustrates the rendered view of FIG. 6 with an exemplary recursive selection dialog.

Consider, for example, FIG. 7. There a screen shot 700 shows an updated rendered view 602 having a recursive selection dialog 702. Through this recursive selection dialog a user is enabled to select to add an instance of a recursive section at the same level as the recursive section with which the recursive selection button 606 is associated in FIG. 6. The dialog 702 shows two options for adding an instance of a recursive section at the same level, an insert above option 704 (entitled "Insert Employee above") and an insert below option 706 (entitled "Insert Employee below"). The dialog also enables the user to remove the recursive section 604 with a remove option 708 (entitled "Remove Employee"). Further, the dialog enables the user to add an instance of the recursive section at a level below that of recursive section 604 with an insert subordinate option 710 (entitled "Insert Sub Employee").

In the illustrated embodiment, the runtime (in some cases using the recursive section logic of FIG. 1), enables the user to select to add as many numbers of employees and to as many levels as the user desires. If, for instance, the user wishes to add thirty employees at the current level of recursive section 604 (e.g., for thirty-one sales managers), each of which has between three and twenty-six salesmen, each of these of which has zero to twelve sales assistants, and so forth, the runtime may enable the user to do so. In at least this sense, the electronic form is enabled to be user-driven, rather than forcing the user to follow a prescribed set of recursive section options. Also, each of the added instances of the recursive section may enable similar or identical instances to be added to the added recursive section. Thus, each recursive section, whether original or later added, may have additional instances added at or below its level.

At block 506, the runtime modifies the electronic form's data structure 132. The user may, for instance, select to add an employee with insert subordinate option 710 (and thus at a lower level as the employee shown with recursive section 604), responsive to which the runtime may add an instance of the recursive section for the additional employee.

At block 508, the runtime alters the form view 134 for the electronic form. It may do so by transforming the data structure with a transformation associated with the recursive section (such as described above). In presenting data-entry fields and the like for the newly added recursive section, the runtime may rely on aspects of the electronic form template 124, such as parts of recursive section logic 130 associated with the recursive section. This logic may set forth a way in which the added recursive section may appear (e.g., shading, orientation, and text).

Figure 8:
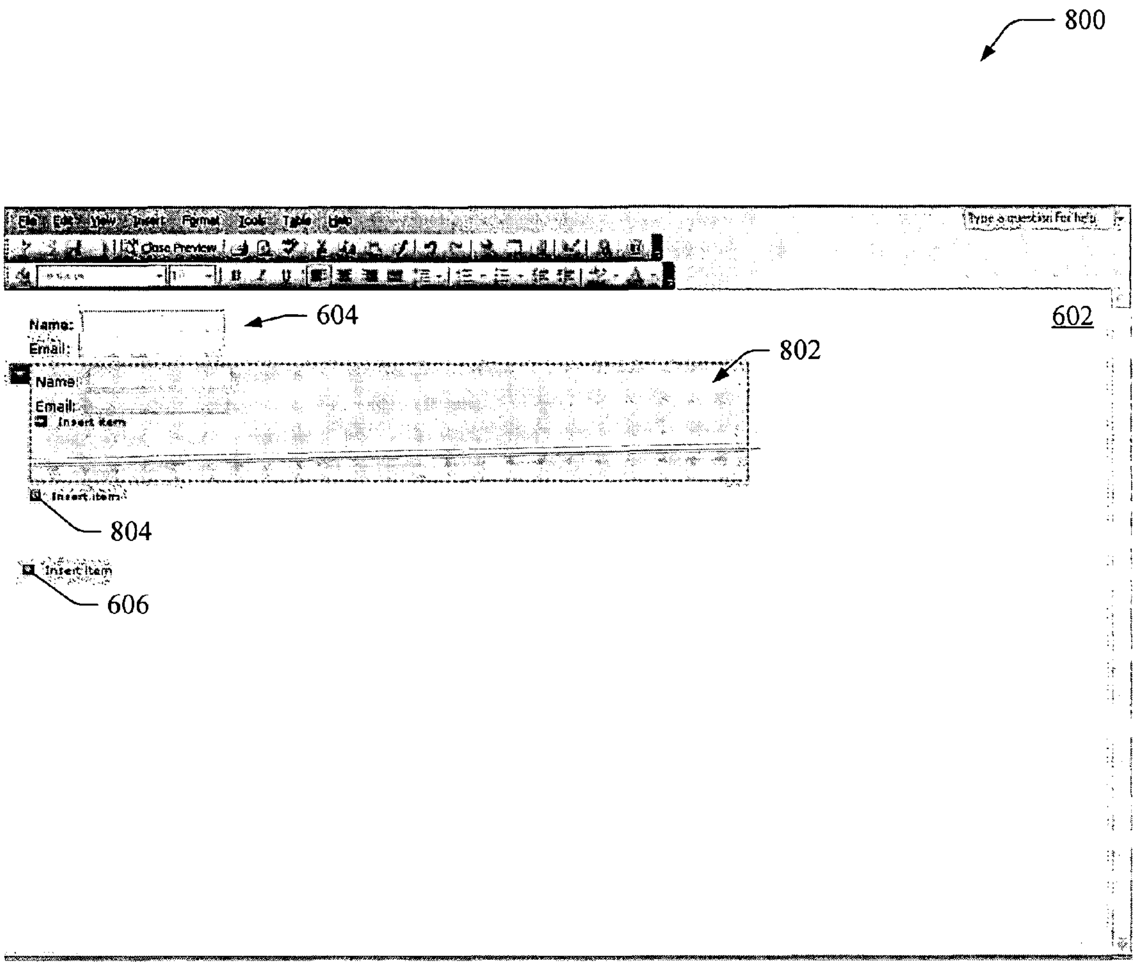
FIG. 8 illustrates the rendered view of FIG. 6 with an exemplary subordinate recursive section.

Consider, for example, FIG. 8. There a screen shot 800 shows an updated rendered view 602 having an added, subordinate recursive section 802 for an additional employee. Note also that the runtime enables the user to add, delete, and or alter recursive sections for both the recursive section 604 and the newly added subordinate recursive section 802. Through recursive selection button 606 and a subordinate recursive selection button 804, the user can continue to add, delete, and alter recursive sections for employees at various levels.

The user may then enter information into the subordinate recursive section.

CONCLUSION

The above-described systems and methods enable creation and/or use of a recursive section for an electronic data-entry form. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. One or more computer-readable media having computer-readable instructions therein that, when executed by a computer, cause the computer to perform acts comprising:

transforming an electronic form from a first format comprising a data structure including eXtensible Markup Language (XML) into a second format comprising an editable form view rendered in hyper text machine language (HTML) representing the data structure, wherein the first format is transformed into the second format with an eXtensible Style-sheet Language Transformation (XSLT), wherein the electronic form comprises a recursive section and the editable form view renders the recursive section, wherein the electronic form is governed by an electronic-form template comprising a schema and a recursive section logic;

enabling a user to graphically modify the recursive section of the electronic form using the editable form view of the second format of the electronic form rendered in HTML without writing script or code; and in response to graphically modifying the recursive section of the electronic form using the editable form view of the second format of the electronic form, transforming the XML data structure of the first format of the electronic form with a transformation associated with the modification of the recursive section of the second format of the electronic form.

2. The media of claim 1, wherein the rendering of the electronic form into the editable form view enables a user to enter data into the electronic form.

3. The media of claim 1, wherein the editable form view of the electronic form comprises hyper text machine language.

4. The media of claim 1, wherein the act of enabling comprises enabling the user to add an arbitrary number of instances of the recursive section to the electronic form.

5. The media of claim 1, wherein the act of enabling comprises enabling the user to add an arbitrary level of instances of the recursive section to the electronic form.

6. The media of claim 1, wherein the act of enabling comprises enabling the user to add an instance of the recursive section to the XML data structure of the electronic form.

7. The media of claim 6, further comprising:

receiving a selection to add the instance; and transforming the XML data structure effective to render the electronic form and display the added instance.

8. The media of claim 1, wherein the act of enabling is performed while maintaining the electronic form's validity to the schema governing the electronic form.

* * * * *